United States Patent [19]
Ito et al.

[11] Patent Number: 6,088,468
[45] Date of Patent: *Jul. 11, 2000

[54] METHOD AND APPARATUS FOR SENSING OBJECT LOCATED WITHIN VISUAL FIELD OF IMAGING DEVICE

[75] Inventors: Wataru Ito, Kodaira; Hirotada Ueda, Kokubunji, both of Japan

[73] Assignee: Hitachi Denshi Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,018

[22] Filed: May 7, 1996

[30] Foreign Application Priority Data

May 17, 1995  [JP]  Japan ..................................... 7-118629
Sep. 7, 1995  [JP]  Japan ..................................... 7-230301

[51] Int. Cl.$^7$ ........................................................ G06K 9/00
[52] U.S. Cl. .......................... 382/103; 342/454; 348/169; 382/219
[58] Field of Search .................................. 348/143, 149, 348/152, 155, 169–172; 382/103, 104, 130, 218, 219; 342/454–457

[56] References Cited

U.S. PATENT DOCUMENTS 5,109,435  4/1992  Lo et al. ................................. 348/172
5,261,010  11/1993  Lo et al. ................................. 382/216

FOREIGN PATENT DOCUMENTS 1-273198  11/1989  Japan .
7-79429   3/1995   Japan .

OTHER PUBLICATIONS

Ueda, "Intelligent Image Handling with Image Recognition Technique", *O plus E*, No. 176, pp. 122–137, Jul. 1994 (in Japanese).

M. Yachida et al., "Automatic Analysis of Moving Images", *IEEE Transactions on Pattern Analysis and Machine Intelligence*, vol. PAMI-3, No. 1, Jan. 1981, pp. 12–19.

D. Thomas et al., "Motion Filtering for Target Extraction and Tracking in Infrared Images", *Proceedings of SPIE—Applications of Artificial Intelligence VI*, vol. 937, Conference, Apr. 4–6, 1988, Orlando, Florida, Apr. 4, 1998, pp. 505–511.

*Patent Abstracts of Japan*, vol. 14, No. 40, P–0995, Jan. 25, 1990 (English abstract of Japanese patent reference 1–273198 published on Nov. 1, 1989).

M. Kaneta et al., "Image Processing Method for Intruder Detection around Power Line Towers", *IEICE Transactions on Information and Systems*, vol. E76–D, No. 10, Oct. 1993, pp. 1153–1161.

*Primary Examiner*—Jon Chang
*Assistant Examiner*—Jayanti K. Patel
*Attorney, Agent, or Firm*—Antonelli, Terry, Stout & Kraus, LLP

[57] ABSTRACT

An apparatus for sensing an object within an imaging field of an image pickup device includes a memory for storing data of a reference background picture of the imaging field, a device for inputting picture data from the image pickup device, a device for comparing the inputted picture data with the stored reference background picture data to detect a difference value between the inputted picture data and the stored reference background picture data, and to detect a polarity of the difference value, a converter for converting the difference value into binarization data based on a difference threshold value which is changed in response to the polarity of the difference value so that an object within the imaging field can be distinguished from an area of increased brightness within the imaging field and an area of increased darkness within the imaging field, a calculator for calculating a similarity between the inputted picture data and the stored reference background picture data, and a detector for sensing whether an object is within the imaging field based on the polarity of the difference value and the similarity.

43 Claims, 23 Drawing Sheets

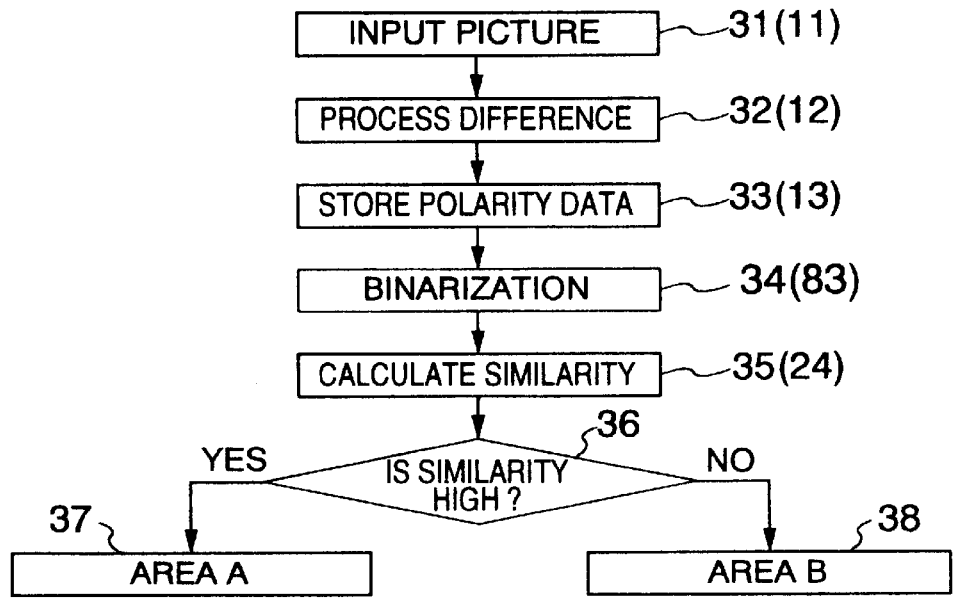
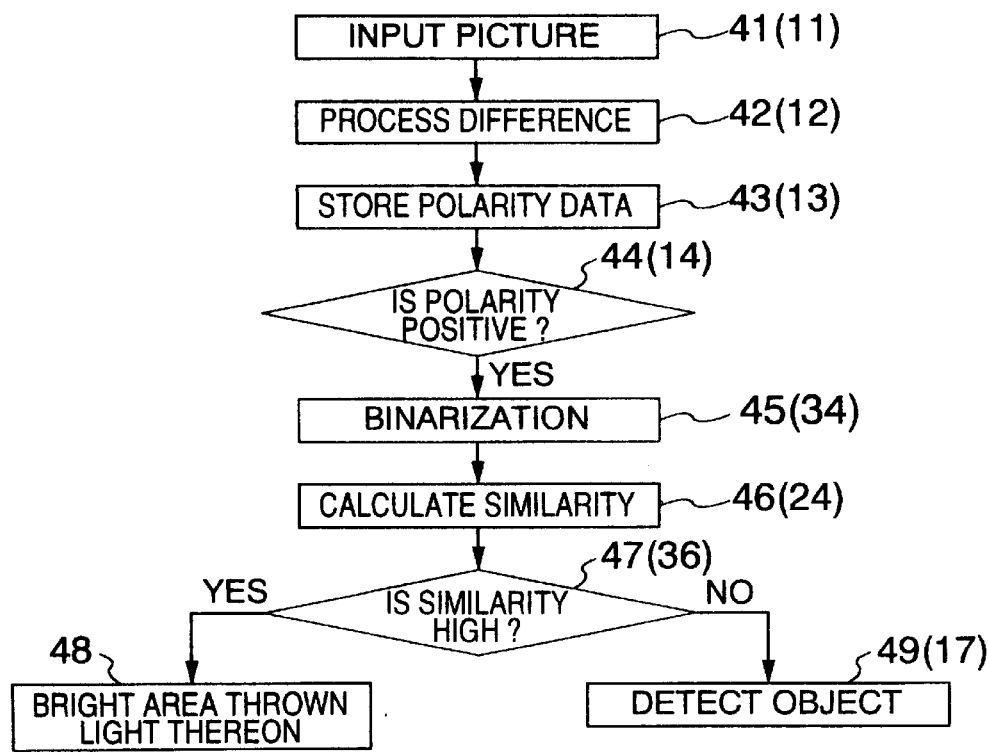

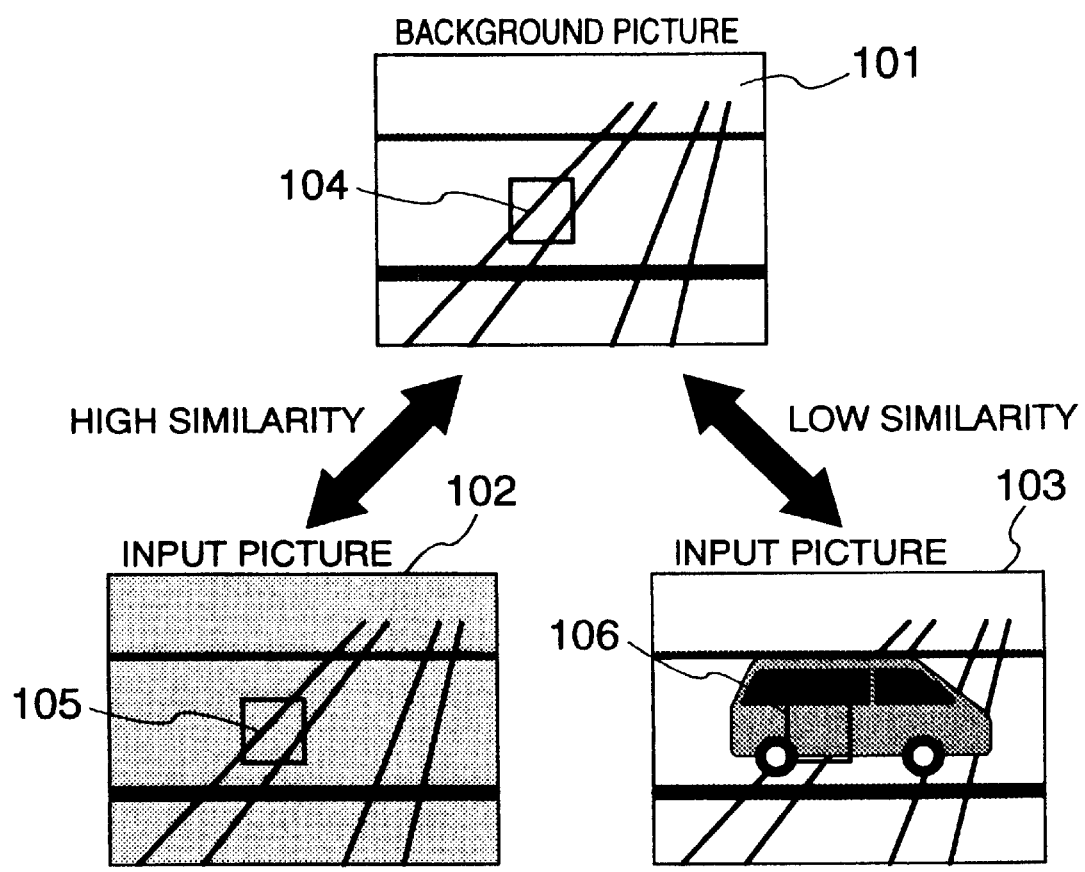

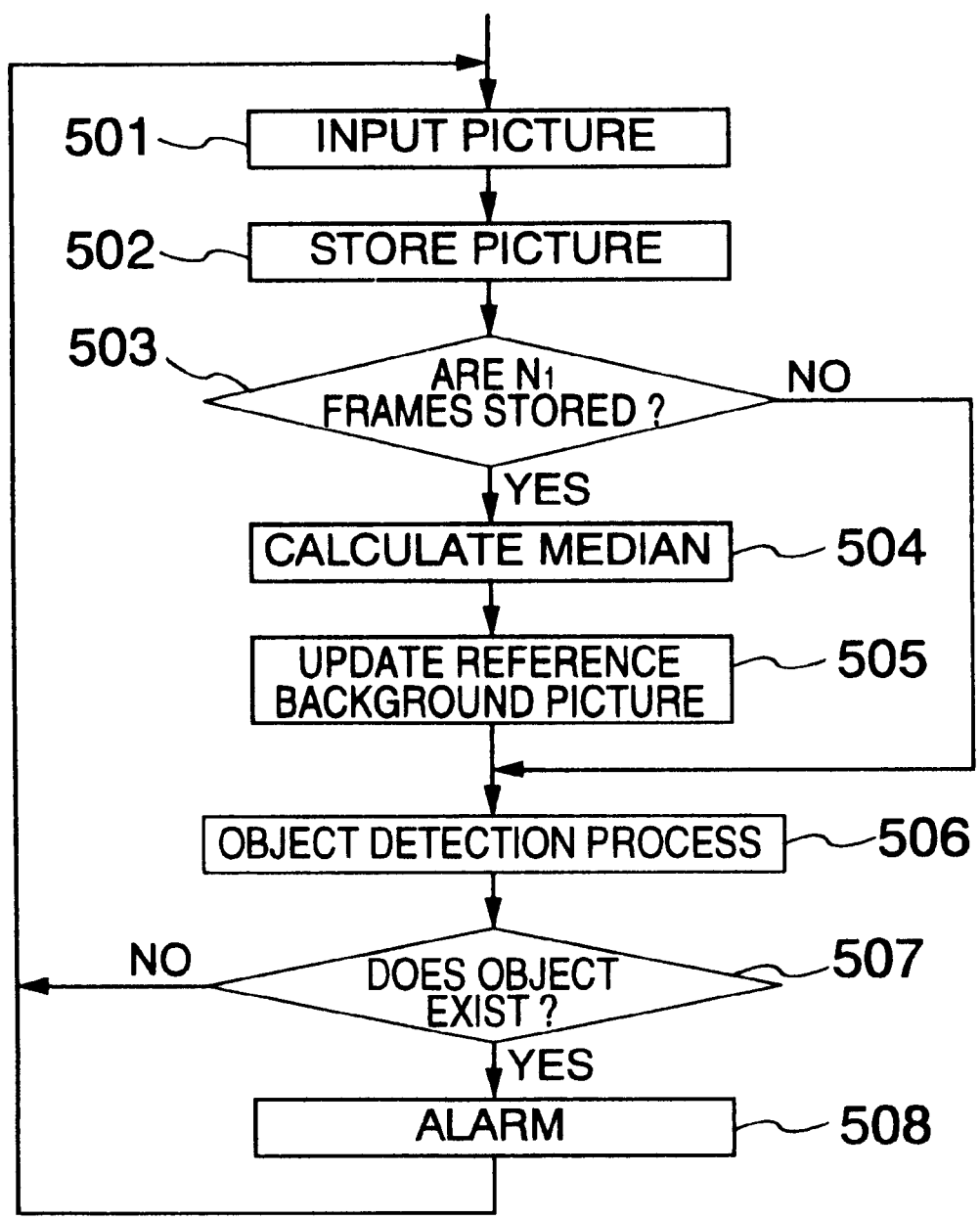

BACKGROUND PICTURE

INPUT PICTURE

DIFFERENCE PROCESSED
PICTURE

BINARY IMAGE

FIG.27
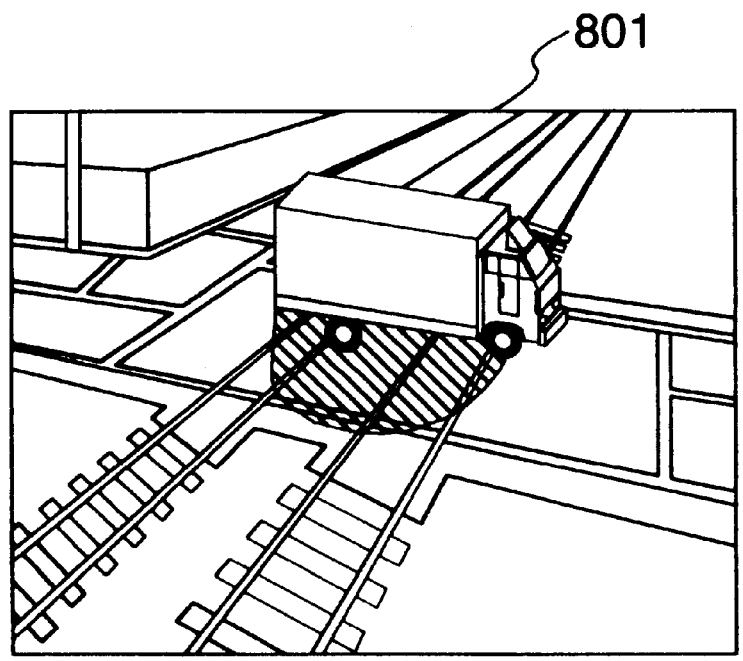
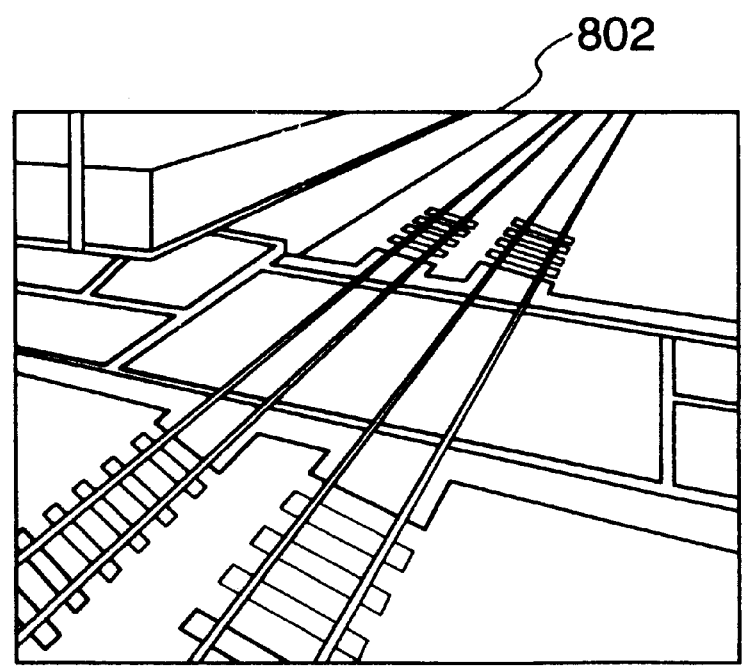

METHOD AND APPARATUS FOR SENSING OBJECT LOCATED WITHIN VISUAL FIELD OF IMAGING DEVICE

BACKGROUND OF THE INVENTION

The present invention relates to a system for monitoring a picture which system uses an imaging device such as a television camera. More particularly, the invention relates to a method and an apparatus for sensing an object in the system for monitoring a picture which method and apparatus are preferable in the case of needing a high reliability such as the case of sensing an object coming into a dangerous zone.

In recent days, a picture monitoring system arranged to use a TV camera has been made public. Of such monitoring systems, there has been requested a system for automatically sensing an object such as a person or a car coming into a field of a monitor based on a video signal independently of human eyes and issuing a predetermined report and alarm. This type of automatic monitoring system is required to sense an object by processing a video signal produced by a TV camera.

As one of the systems for sensing an object by processing such a video signal, there has been known and widely used as a difference method wherein the latest picture coming to the system in sequence is compared with the one previous picture, a difference of a luminance for each corresponding pixel is obtained, and an area with a large difference as an object area.

The basic flow of the system for sensing a difference is detected value will be described with reference to the flowchart of FIG. 8. As shown, at a step 81, a current picture is captured from a TV camera. At the next step 82, a difference of a luminance is obtained between a pre-stored background picture and the captured picture. Then, at a step 83, binarization process is made for the difference value. At last, at a step 84, the digital value is compared with a predetermined threshold value for sensing if an object exists based on the compared result.

For example, as shown in FIG. 9A, assume that the background picture taken by a TV camera is a railroad crossing. The picture shown in the left hand of FIG. 9B is taken when one car 90 is coming into this crossing. The picture shown in the right hand of FIG. 9B is derived from the binarization of the difference value of the pixel data for each pixel between the background picture of FIG. 9A and the picture shown in the left hand of FIG. 9B.

In this type of system, partial breaks or gaps 91 appear in an object to be sensed as indicated in the picture shown in the right hand of FIG. 9B. These breaks or gaps may bring about an error in sensing an object.

However, this drawback may be overcome by applying a dilation and erosion operation to the system.

As an applied example of a system for sensing a moving object by processing a difference, for example, an article entitled "Intelligent Image Handling with Image Recognition Technique" written by Ueda et. al. has been published in "O plus E" No. 176, pp. 122 to 136.

The system for sensing a moving object described in this article is arranged to sense an object from three pictures continuing in time. As shown in FIG. 11, at first, assume that the three continuous pictures 111, 112, 113 in time are input. Luminance differences between the pictures 111 and 112 and between the pictures 112 and 113 are calculated. These two luminance difference values are binarized and then are subjected to the dilation and erosion operation, as a result of which pictures 114 and 115 are obtained. Next, these binary images (pictures) 114 and 115 are ANDed for deriving common portions between these pictures, from which portions a picture 116 of the object is obtained.

In the aforementioned disclosed method, however, the following erroneous sensing may take place. That is, though an object is not actually coming into the view field, an object is erroneously sensed. For example, as shown in FIG. 9C, if the change of weather or lighting conditions leads a change of brightness of an overall object to be imaged, an object 93 (railroad) may be erroneously sensed though no object is coming into the view field. As shown in FIG. 9D, if an object located out of the view field is made so luminous that a reflected light 94 may appear in the area within an imaging field, the reflected light is erroneously sensed as an object 95. Further, as shown in FIG. 9E, if a shadow 96 of the object located out of the field is falling on the area within the imaging field, the shadow may be erroneously sensed as an object 97.

By the way, this differential calculation needs a reference background picture (for example, FIG. 9A). Hence, the reference background picture is created in advance and then pre-stored in a memory. To create the reference background picture, there has been known a system arranged to use a video signal (normally, a video signal of one frame) taken when no object is coming into the view field as the reference background picture according to the operator's selection or a system arranged to average a predetermined number of frames composing a picture at each pixel and to use the averaged frames as the reference background picture.

In the former system, the instantaneous picture is selected based on human determination. If any noise is mingled into the video signal by chance, the noise is held in the background picture. It is thus difficult to obtain the exact background picture. Further, from a view point of the noise circumstances in the transmission system, the mingling of the noise is not so rare. In the practical use, therefore, it is a great obstacle.

In the latter system, to obtain the exact background picture, it is necessary to make the number of frames composing the picture to be averaged as numerous as 1500 frames, for example. As a result, a large time gap (about 50 seconds in a frame frequency of 30 Hz) takes place between a time when a picture for creating the reference background picture is input and a time when a difference is processed for sensing the object. Hence, for example, if the imaging field is gradually made gloomier at dusk, for example, the time gap makes it impossible to create a sufficiently exact reference background picture to allow the object to be sensed.

SUMMARY OF THE INVENTION

It is an object of the present invention to provide a method and an apparatus for reliably and exactly sensing an object coming into a view field of an imaging device for a short time.

It is a further object of the present invention to provide a method and an apparatus for sensing an object which method and apparatus bring about no erroneous sensing resulting from the adverse effect of disturbance factors such as a change of weather or lighting conditions, reflected light or a shadow.

It is a still further object of the present invention to provide a method and an apparatus for sensing an object which method and apparatus serve to positively distinguish any portion where a local temperature is changed within the view field of the imaging device from the other portions.

It is another object of the present invention to provide a method and an apparatus for sensing an object with high reliance by providing a method in automatically creating a suitable reference background picture for deriving a difference value for a short time.

In the method and apparatus for sensing an object coming into a imaging field of an imaging device according to a present invention, the process is executed for storing in a storage unit data of the reference background picture located within the imaging field, reading the data of the picture taken by the imaging device, comparing the data of the reference background picture with the read picture data at each pixel, outputting a difference value of each pixel, comparing the difference value with a predetermined threshold value at each pixel, creating digital data of an object image based on the compared result, sensing if the object exists based on the binary data, and properly updating the data of the reference background picture stored in the storage unit.

The other objects and advantages of the present invention will be apparent from the following description with reference to the accompanying drawings.

BRIEF DESCRIPTION OF THE DRAWINGS

FIG. 3 is a flowchart for describing an operation of a still further embodiment of the present invention;

FIG. 4 is a flowchart for describing an operation of another embodiment of the present invention;

FIG. 10 is a view for describing the effect of a similarity used in sensing an object according to the present invention;

FIG. 23 is a flowchart showing an operation of an embodiment in which the present invention is applied to sensing an object coming into a railroad crossing;

FIG. 27 is an explanatory view showing an operation of sensing an object according to the embodiment of the present invention.

DESCRIPTION OF THE PREFERRED EMBODIMENTS

Later, the description will be oriented to an embodiment of the present invention with reference to the drawings.

FIGS. 1 to 7 are flowcharts showing the operations of the embodiments arranged to sense an object intruding into the inside of a field of an imaging device. The methods according to these embodiments can be executed by the imaging device and a computer and under the control of a program configured to code a shown flowchart stored in a storage medium with a help of the computer.

Figure 12:
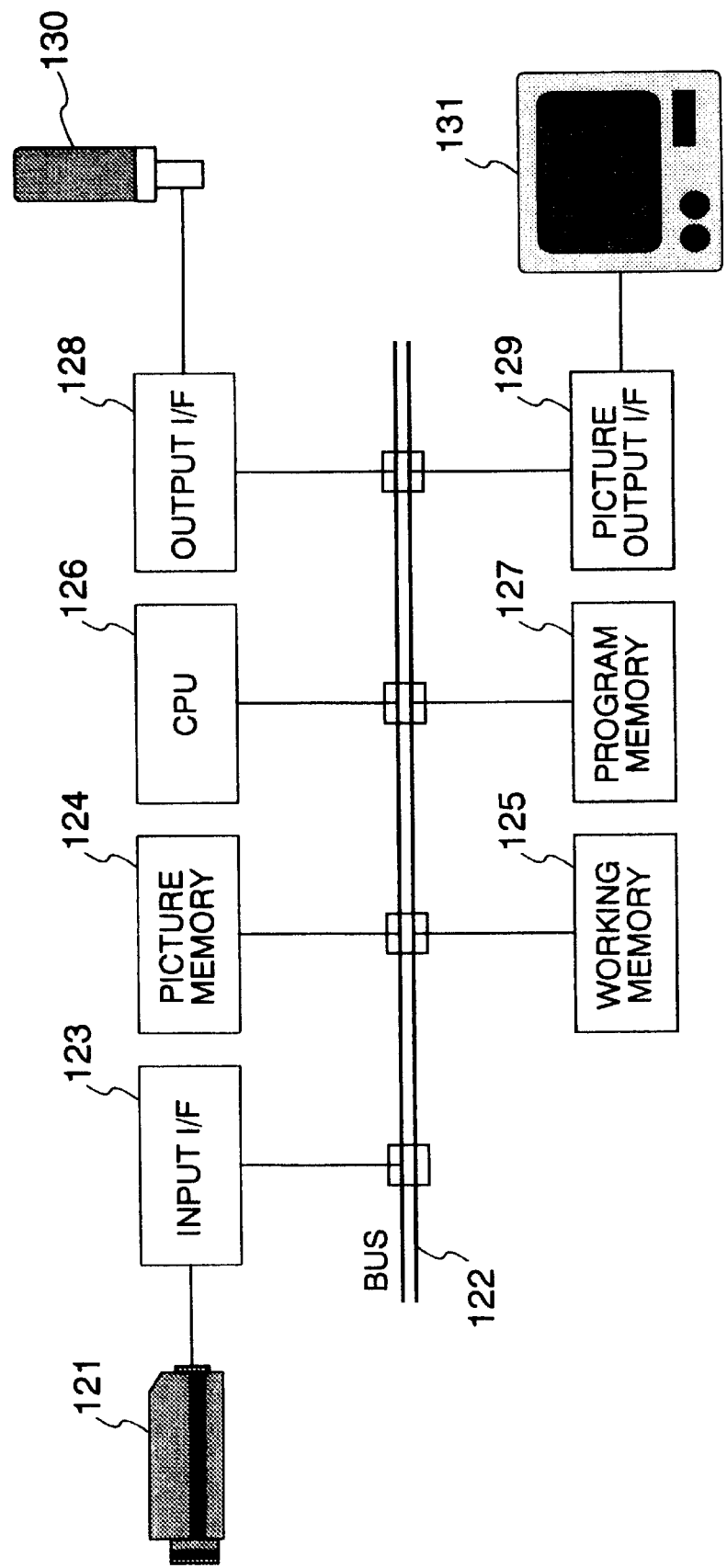
FIG. 12 is a block diagram showing a system for monitoring a picture to which an embodiment of the present invention is applied.

Before describing the methods shown in FIGS. 1 to 7, the description will be oriented to a system for monitoring a picture according to an embodiment of the present invention with reference to FIG. 12.

FIG. 12 shows the picture monitoring system according to the embodiment of the invention. As shown, a TV camera 121 captures a picture of an area to be monitored (a monitoring field) and produces a video signal. The video signal is sent to a picture memory 124 through an input interface (I/F) 123 and a data bus 122.

On the other hand, a CPU 126 operates to analyze the picture by using a working memory 125 in accordance with a program stored in a program memory 127 and then starts to sense an object. Based on the process of sensing an object, the program is executed to turn on an alarm lamp 130 through an output interface (I/F) 128 or display the picture on a monitor 131 through a picture output interface (I/F) 129. The program for executing the operations of the flowcharts of FIGS. 1 to 7 is saved in the program memory 127.

Figure 1:
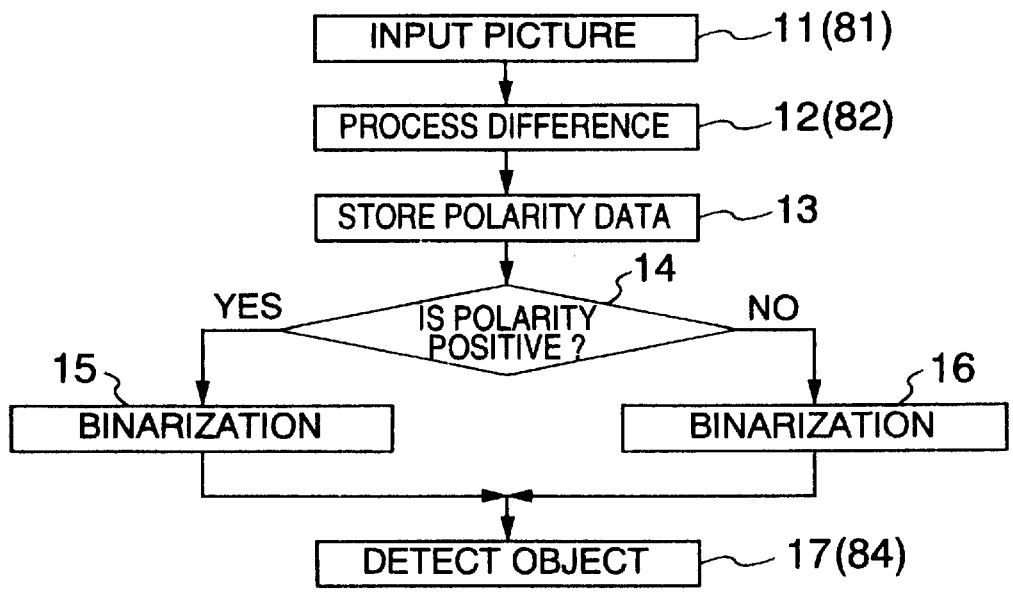
FIG. 1 is a flowchart for describing an operation of an embodiment of the present invention.

Along the flow shown in FIG. 1, at a step 11 of inputting a picture, a picture is read from a TV camera. Then, at a step 12 of processing a difference, the operation is executed to calculate a difference of each pixel between the read picture and a pre-created reference background picture saved in a memory. Next, at a step 13 of saving polarity data, a polarity of a difference value of a luminance is saved in a memory. At a next determining step 14, the operation is branched depending on the polarity. If the polarity is positive, a first binarization process (step 15) is executed. If it is negative, a second binarization process (step 16) is executed. The binarization process is executed to compare the difference value with a threshold value.

These first and second binarization processes (steps 15 and 16) have a corresponding variable threshold values. Hence, if the quality of the change of a luminance against the reference background picture is variable depending on if the polarity is positive or negative, a exact binarization processes can be executed. In accordance with the binarized result, at a step 17, the object is allowed to be positively sensed.

For example, assume that the change of the input picture against the reference background picture is brought about by the change of the weather from cloudy to clear or applying a ray of light to the object. This change causes the polarity of the difference to be positive. Or, if the change is brought about by the shadow cast by the object so that the picture itself is made gloomier, this change causes the polarity of the difference to be negative. The variation depends on the polarity of the difference, that is, if it is positive or negative. Hence, since the prior art operates to simply binarize the absolute value of the difference with a unique threshold value, it does not cope with the wide variation.

However, the method shown in FIG. 1 is arranged to change the threshold value depending on the direction of the change, that is, the threshold value depending on whether the polarity of the difference is positive or negative. Hence, this method enables to flexibly cope with the variation, so that the object may be exactly sensed.

Figure 2:
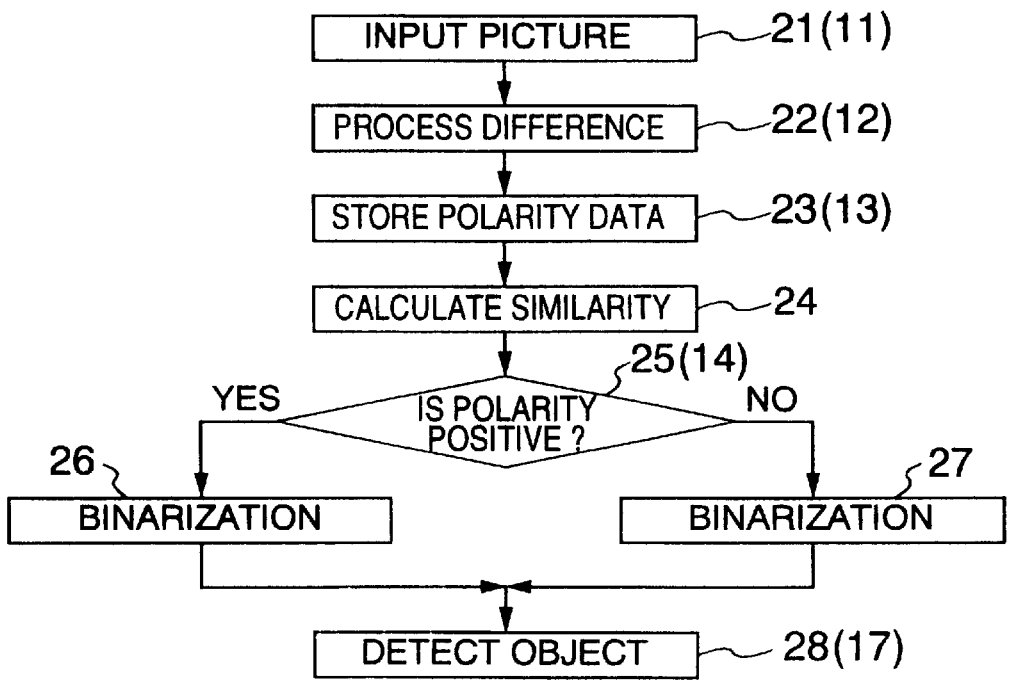
FIG. 2 is a flowchart for describing an operation of a further embodiment of the present invention.

In the flow shown in FIG. 2, a process at a step 24 is added to the process shown in FIG. 1. The process at the step 24 is executed to calculate a similarity of a local luminance distribution pattern between the input picture and the reference background picture. The flow of FIG. 2 is arranged to contain the similarity as the binarization conditions in the first and the second binarization processes (steps 26 and 27). Hence, this processing flow can more flexibly cope with the variation of the input picture against the reference background picture, so that more exact sensing is made possible. The description about the operations of steps 21 to 23, 25 and 28 is left off, because they correspond to the steps 11 to 13, 14 and 17 of FIG. 1, respectively.

Herein, the similarity represents a correlation of the input picture to the reference background picture about the pattern of a local luminance distribution. In FIG. 10, assume that the whole input picture is made gloomier as compared to the reference background picture 101 as indicated by a numeral 102 by the change of illuminance in the imaging environment. In this case, patterns of the background picture 101 such as white lines and railroad are left in the input picture 102 as they are. Hence, a high similarity takes place between a local area of the background picture 101, for example, an area 104 and a local area 105 of the input picture 102.

On the other hand, unlike the reference background picture, as indicated by 103, on the area of the input picture where an object (vehicle) 106 is located, the patterns such as white lines and railroad are disappeared, because the object 106 hides the background. Hence, a low similarity takes place between the areas 104 and 106.

In the flow of FIG. 3, at the next step 35 to the binarization step 34, the similarity is calculated. At a step 36, the calculated similarity is compared with the reference value. Depending on whether or not the similarity is higher than the reference value, two areas A and B having the different qualities from each other, that is, the area where the luminance of the background picture is changed and the area where the object is located, are separated from each other.

The calculation of the similarity at step 35 is executed only for the pixels at which the difference value exceeds the predetermined threshold value in the binarization process at the step 34. This makes it possible to reduce an amount of calculation to a minimum.

Figure 9A:
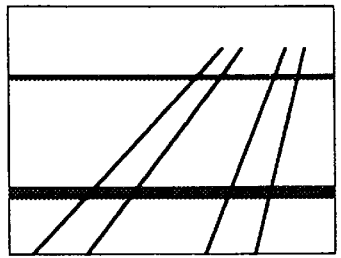
FIGS. 9A, 9B, 9C, 9D, and 9E are pictures for describing a problem caused in sensing an object by using the differential calculation.
Figure 9B:
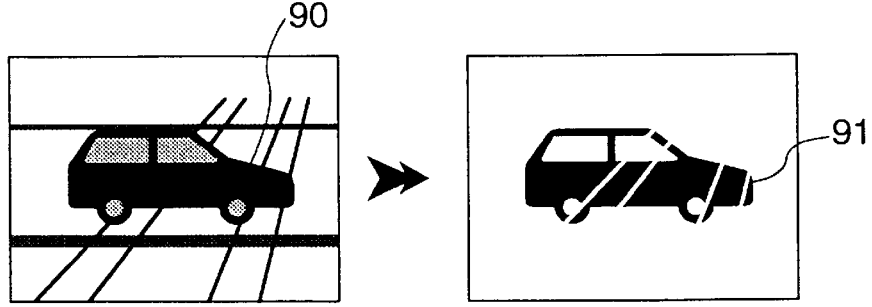
Figure 9C:
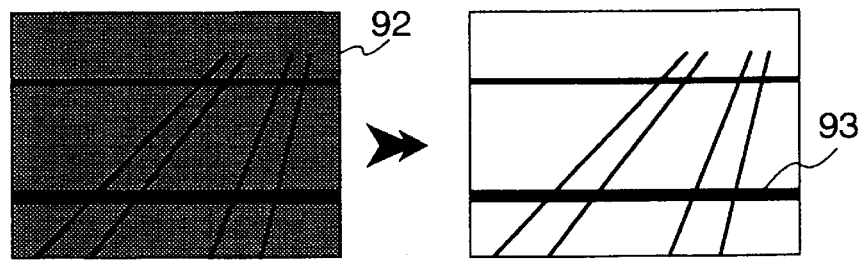
Figure 9D:
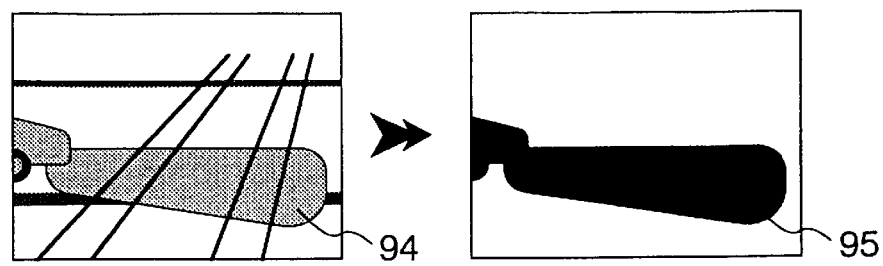

In the flow of FIG. 4, for sensing an object, the process of estimating the similarity is added to the process shown in FIG. 2. If the polarity of the difference is positive, the binarization process is executed at a step 45. Then, at a step 46, the similarity of the form of a local luminance distribution is calculated between the input picture and the reference background picture. At a step 47, the similarity is compared with the reference value. As shown in FIG. 9D, if there exists such an area 94 as being brighter by light applied from a lamp, it is determined that the polarity of the difference is positive and the similarity is high. Hence, at a step 48, it is not determined that any object exists in the area 94. Conversely, if the polarity of the difference is positive and the similarity is not so high (103 of FIG. 10), at a step 49, it is determined that there exists an object in the area 94.

That is, as indicated by the area 94 of FIG. 9D, in the area that is made brighter by light, though the luminance is made higher, the patterns on the road are left. Hence, like the local areas 104 and 105 of FIG. 10, the similarity is made higher.

The use of this similarity, therefore, makes it possible to reliably distinguish the object from the area 94 that is made brighter by a ray of light applied from the lamp.

Figure 5:
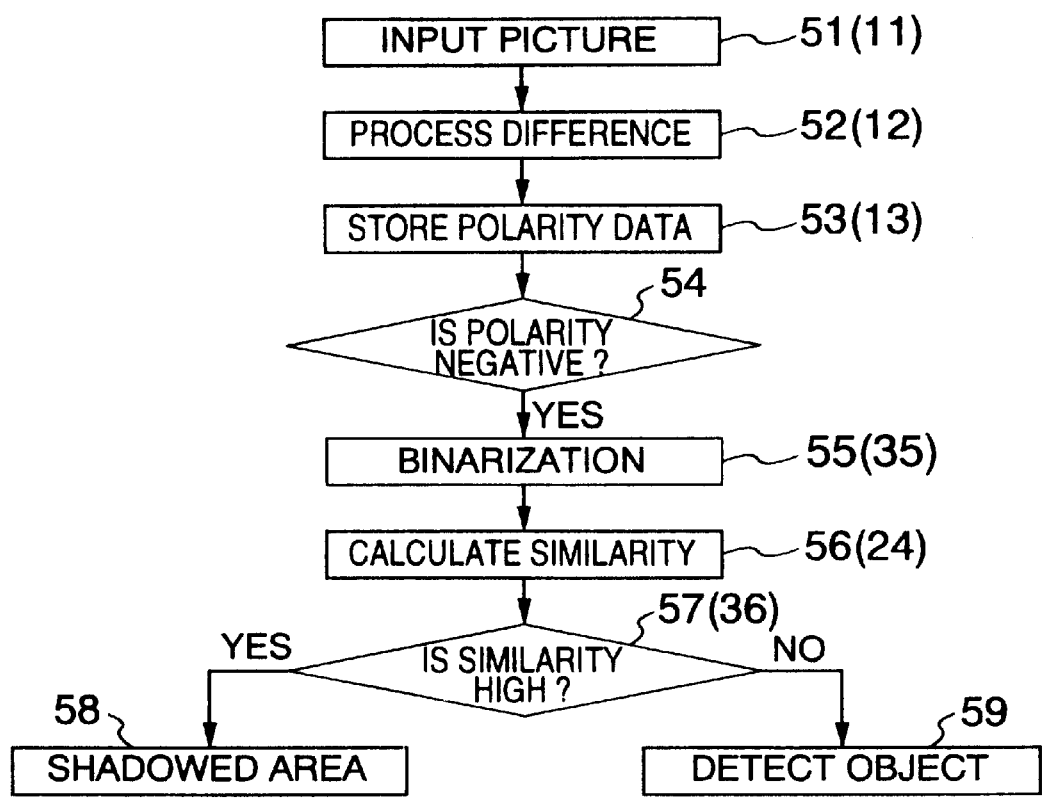
FIG. 5 is a flowchart for describing an operation of another embodiment of the present invention.
Figure 9E:
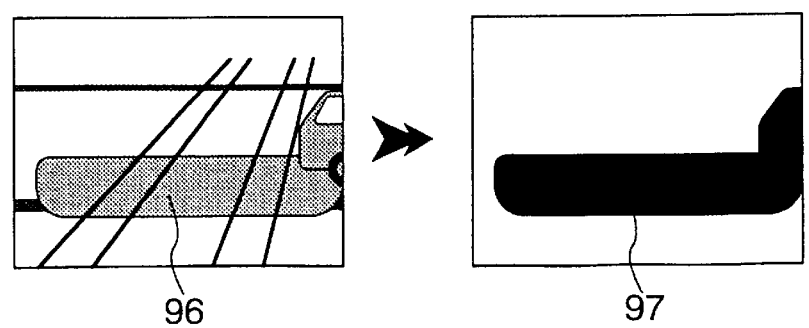
Figure 11:
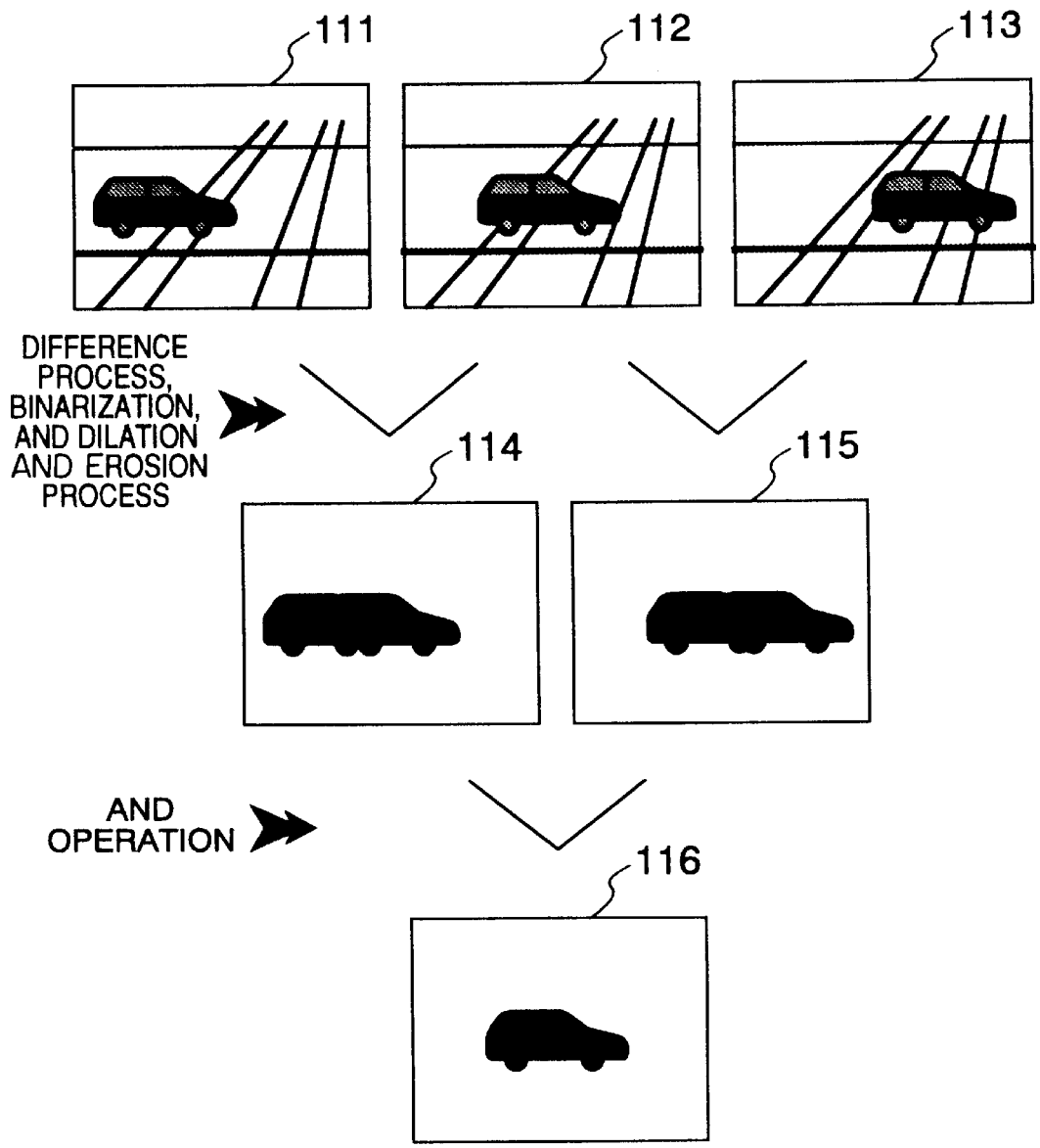
FIG. 11 is an explanatory view for sensing an object based on a difference in time according to the prior art.

Next, in the flow of FIG. 5, like FIG. 4, for sensing an object, the process of estimating the similarity is added to the process shown in FIG. 2. If the polarity of the difference is negative, at a step 55, the binarization process is executed. At a step 56, the process is executed to calculate a similarity of the pattern of a local luminance distribution between the input picture and the reference background picture. At a step 57, the similarity is compared with the reference value. As shown in FIG. 9E, if there exists an area 96 that is made dark by the shadow of the object, it is determined that the polarity of the difference is negative and the similarity is high. Hence, at a step 58, it is not determined that any object exists in the area 96 (shadow). Conversely, if the polarity of the difference is negative and the similarity is not so high, at a step 59, it is determined that there exists an object in the area 96.

That is, in the area that is made dark by the shadow of the object itself, as indicated by the area 96 of FIG. 9E, though the luminance is low, the patterns on the road are left. Like the local areas 104 and 105 in FIG. 10, hence, the similarity is made higher.

The use of this similarity, therefore, makes it possible to reliably distinguish the object from the area 96 that is made dark by the shadow.

Figure 6:
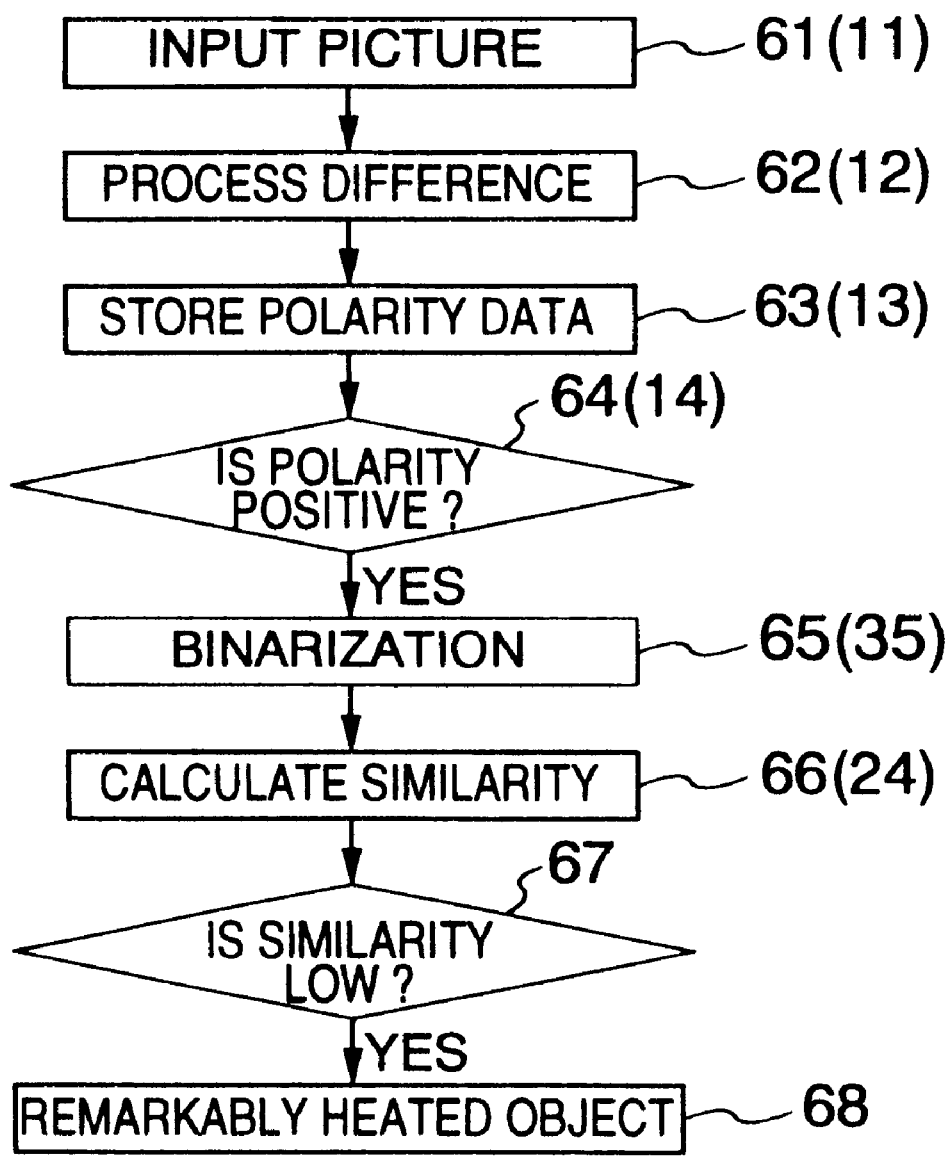
FIG. 6 is a flowchart for describing an operation of another embodiment of the present invention.

In the flow of FIG. 6, there is introduced a process (step 67) of estimating a similarity of the pattern of a local luminance distribution between the input picture and the reference background picture. This added process makes it possible to sense an area where a temperature locally goes up.

At a step 61, an object is imaged by an infrared TV camera. The captured video signal is saved as the input picture in a memory. At a step 62, at each pixel, the read input picture is compared with the reference background picture imaged by the same infrared TV camera and pre-stored in the memory for sensing the difference value between both of the pictures and its polarity. Then, at a step 63, the polarity data is stored in a memory. If, at a step 64, the polarity is determined to be positive, at a step 65, the difference value calculated at the step 62 is compared with a predetermined reference value (threshold value) so that the binarization process may be executed. At a step 66, the operation is executed to calculate the similarity between the reference background picture and the input picture. If, at a step 67, the similarity is determined to be low, at a step 68, it is determined that there exists in the input picture an area (object) where a temperature goes up.

That is, a difference of a luminance distribution takes place between the area where the local temperature goes up and the area where it keeps stable. The similarity of the form of the luminance distribution between the input picture and the reference background picture is made low. For example, assume that the method for sensing an object as shown in FIG. 6 is applied to sensing a pyroclastic flow. If a lava dome is formed by the pyroclastic flow, the temperature abruptly goes up in the local area of the lava dome. Hence, the similarity is made lower. On the other hand, for example, as to the clouds that are made warmer by the pyroclastic flow, the temperature goes up uniformly for the whole clouds. Hence, the similarity is made higher.

Hence, the process (step 67) of estimating the similarity is added to the process of FIG. 1 in order that the warmed clouds may be distinguished from the pyroclastic flow.

Figure 7:
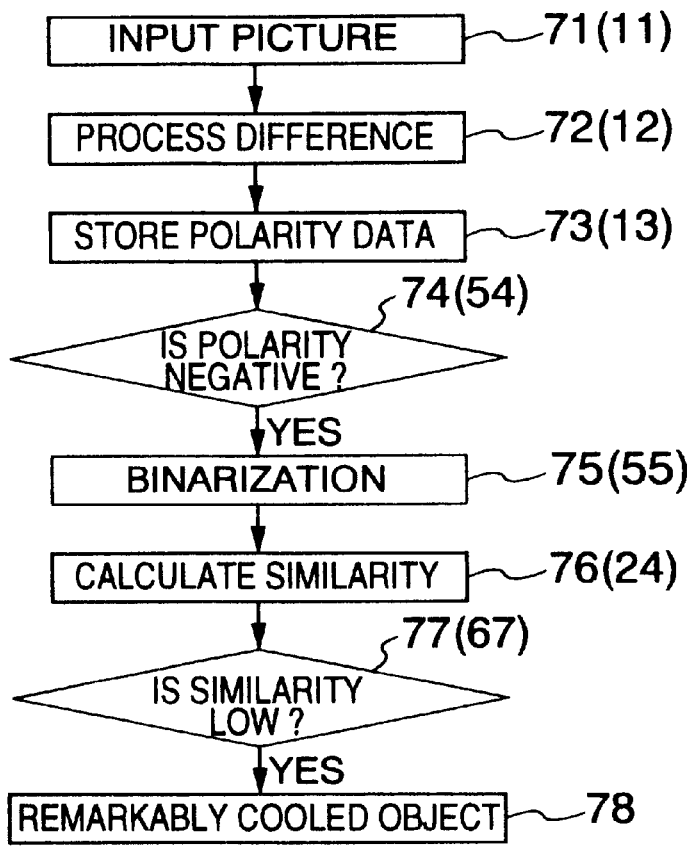
FIG. 7 is a flowchart for describing an operation of another embodiment of the present invention.
Figure 8:
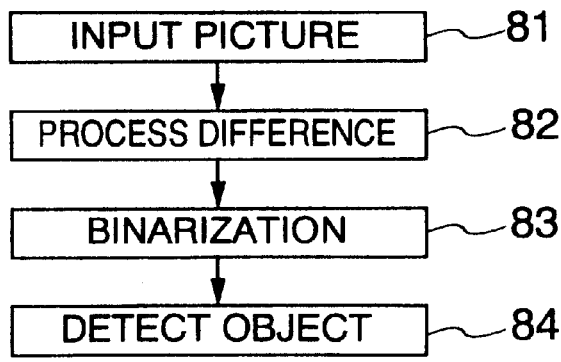
FIG. 8 is a flowchart for describing an operation of sensing an object by using a differential calculation.

In the flow of FIG. 7, there is introduced a process (step 77) of estimating a similarity of the form of a local luminance between the input picture and the reference background picture. This process makes it possible to sense a local area where the temperature goes down.

At a step 71, an object is imaged by an infrared TV camera. The video signal captured by the TV camera is read as an input picture in a memory. At a step 72, the reference background picture taken by the infrared TV camera and pre-stored in a memory is compared with the read input picture at each pixel so that the difference value between both of the pictures and its polarity may be sensed. At a step 73, the polarity data is stored in a memory. If the polarity is determined to be negative at a step 74, at a next step 75, the difference value calculated at the step 72 is compared with the predetermined reference value (threshold value) so that the binarization process may be executed. At a step 76, the process is executed to calculate a similarity between the reference background picture and the input picture. If, at a step 77, the similarity is determined to be low, at a step 78, it is determined that there exists an area (object) whose temperature goes down in the input picture.

That is, a difference of a luminance distribution takes place between the local area whose temperature goes down and the local area whose temperature is inhibited to go down. The similarity of the pattern of a luminance distribution is made lower between the input picture and the reference background picture. For example, consider that the method for sensing an object as shown in FIG. 7 is applied to sensing a pyroclastic flow. If the lava dome is fell down, the temperature of the lava dome is abruptly made lower, because the heat source of the lava dome is dropped. It means that the similarity is lower. On the other hand, for example, as to the clouds warmed by the pyroclastic flow, if the application of heat to the clouds by the heat source is reduced, the whole clouds are substantially uniformly cooled down. Similarly, the temperature of the clouds may uniformly go down. Hence, the similarity is made higher.

At a step 77 of estimating the similarity, therefore, the process makes it possible to separate only the object (area) whose temperature locally goes down from the other objects in sensing the objects.

Later, the method for sensing an object according to the present invention will be described in detail along the illustrative embodiments.

The below-described embodiments are arranged so that the present invention is applied to a picture monitoring system for sensing an object such as a walker or a car coming into a railroad crossing. A TV camera is installed at a site where the camera can take a look at the whole railroad crossing. The TV camera produces a video signal representing the picture taken by the camera itself. The video signal is processed for sensing an object. The description about the embodiment will be expanded along the flowcharts. The operation of the flowchart about the embodiment is executed by the system shown in FIG. 12.

Figure 13:
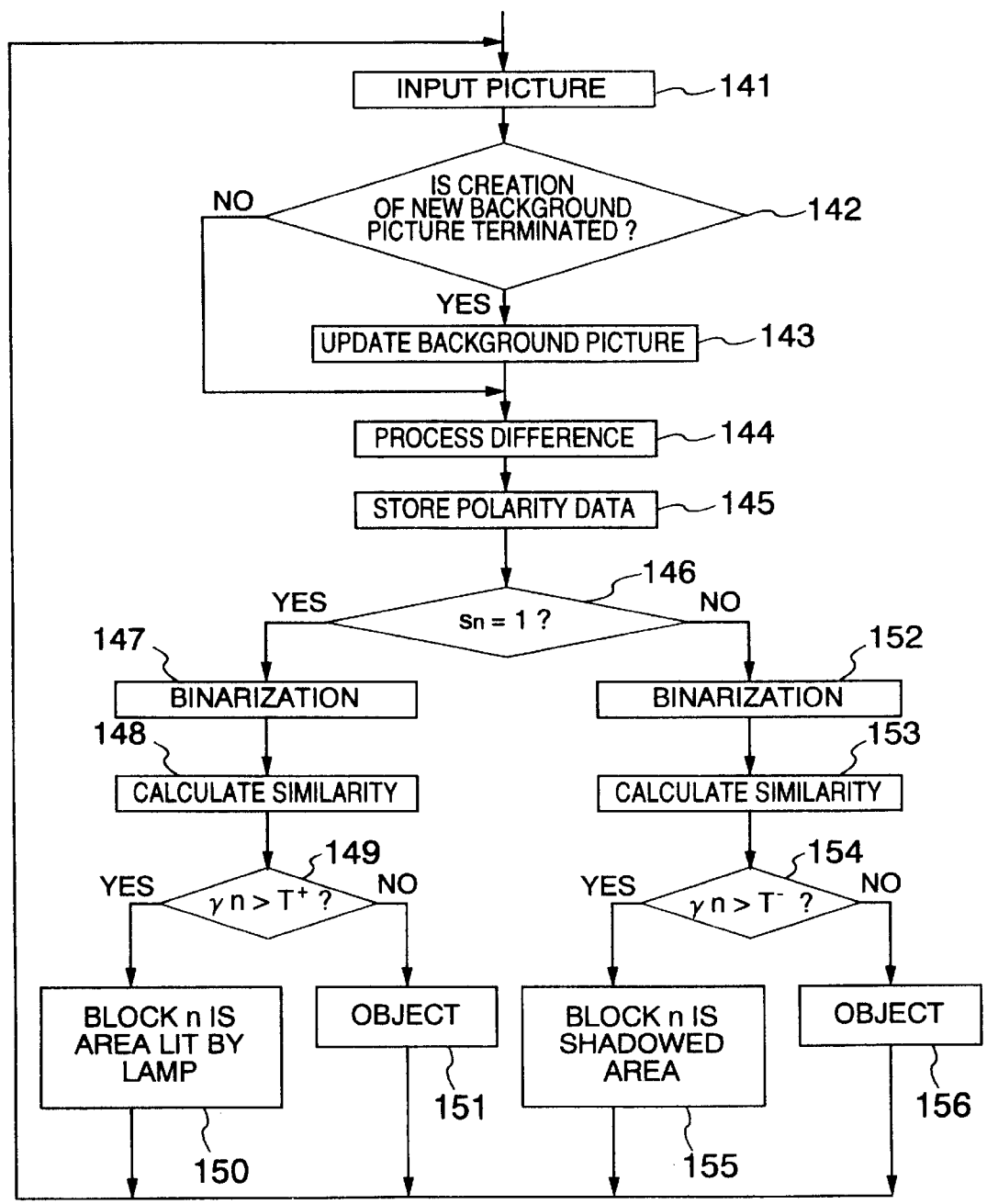
FIG. 13 is a flowchart showing an embodiment in which the present invention is applied to sensing an object coming into a railroad crossing.

FIG. 13 shows an object sensing process executed by the CPU 126 according to an embodiment of the invention. The process executed by this embodiment is a combination of the processes shown in FIGS. 4 and 5 to which a process of updating a background picture is added.

When the process of FIG. 13 is started, at a step 141 of inputting a picture, a video signal picked by a camera 121 is read as the image data f(x, y) consisting of 320×240 pixels, where x and y are coordinates of pixels on the screen and f(x, y) represents a luminance value of a pixel at the coordinates (x, y).

Next, at a determining step 142, it is determined whether or not the new reference background picture is created.

Figure 14:
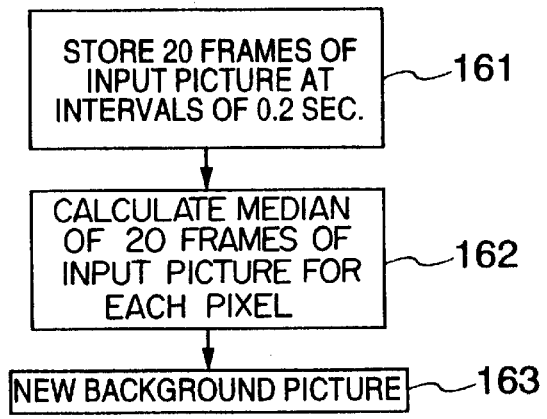
FIG. 14 is a flowchart showing a process for creating a background picture according to an embodiment of the present invention.

In order to create and update this reference background picture, the CPU 126 executes the process shown in FIG. 14 in parallel with the flow of FIG. 13.

Entering the flow of FIG. 14, at first, at a step 161, the frames of the input picture are captured from the TV camera at regular intervals of 0.2 second. When the frames of the captured picture reach 20, those 20 frames are saved (stored) in a memory.

Next, at a step 162, for each pixel, the median of the 20 frames is calculated by the following expression (1) for creating the background picture data r(x, y).

$$r(x, y) = \underset{1 \leq k \leq 20}{\mathrm{med}} \{f^{(k)}(x, y)\} \qquad (1)$$

wherein $f^{(k)}(x, y)$ represents the picture data for 20 frames and k=1, 2, . . . , 20.

In the expression (1), med { } represents a median. The pixels at the same location of the 20 frames are ranged in greater order of their luminance values. Taking the pixel of the tenth (middle) value, the pixel is assumed as the background picture data r(x, y). At a step 163, this expression (1) is calculated for deriving the new reference background picture.

Hence, the reference background picture 163 is made equivalent to the picture data r(x, Y).

In this embodiment, only 20 frames of the picture are sampled at regular intervals of 0.2 seconds. The frame period of the imaging device such as the normal TV camera is 1/60 second. To read the picture on which the median calculation is done, of 60 frames per one second output from the TV camera, any number of frames may be read at proper intervals if necessary. That is, the output frames of the imaging device are properly thinned out for reading them. Or, the picture may be read at a longer period than the output period of the frame of the imaging device. We will further explain this matter later.

Going back to the process of FIG. 13, if the creation of the background picture is terminated, at a step 143, the existing reference background picture stored in the memory is updated to a new reference background picture that has been just created. Then, the operation goes to the next step 144. If the creation of the new reference background picture is not terminated, the operation goes to the step 144 of processing a difference. At a step 144, the input picture is divided into blocks each consisting of 2×2 pixels. The overall picture is divided into a block area $f_n(i, j)$ consisting of 160×120 blocks. Then, an average luminance Af of each block area is derived, where n is a block number and i, j represents a coordinate location of a pixel inside of the block.

Further, for the reference background picture data r(x, y), likewise, the overall picture is divided into a block area $r_n(i, j)$ consisting of 160×120 blocks. Then, an average luminance Ar of each block area is derived. The average luminances $A_f$ and $A_r$ of each block area are calculated by the following expression (2):

$$A_f = \frac{1}{[B]} \sum_{i,j \in B} f_n(i, j) \quad (2)$$

$$A_r = \frac{1}{[B]} \sum_{i,j \in B} r_n(i, j)$$

where B represents the subject block area, [B] represents a pixel number contained in the area B. (This embodiment uses a block consisting of 2×2 pixels. Hence, i, j∈B represents 0≦i≦1 and 0≦j≦1 and [B] is four.)

Next, a difference value $\epsilon_n$ of an average luminance between the input picture and the reference background picture is derived at each block by the expression (3).

$$\epsilon_n = |Af - Ar|(n=1, 2, 3 \ldots) \quad (3)$$

At the succeeding step 145 of saving the polarity data, the polarity data $S_n$ of the difference is derived by the expression (4) and then is saved in a memory.

$$s_n = \begin{cases} 1 & (Af > Ar) \\ -1 & (Af \leq Ar) \end{cases} \quad (4)$$

Next, at a determining step 146, the operation proceeds to the first or the second binarization step 147 or 152 according to the polarity data $S_n$.

These binarization processes are executed by comparing the difference value $\epsilon_n$ with a predetermined threshold value. The threshold value for the positive polarity $S_n$, that is, the threshold value th+ at the step 147 is derived by the expression (5).

$$\mu^+ = \frac{\sum_{d \in R^+} \epsilon_d}{[R^+]} \sigma^+ = \sqrt{\frac{\sum_{d \in R^+} (\epsilon_d - \mu^+)^2}{[R^+]}}$$

where $\epsilon_d$ represents a difference value between the input pixel and the background picture at the d-th block (see the expression (2)), $\mu^+$ is an average difference value of the blocks having positive difference values of the blocks predetermined to contain no object, this value representing an average level of noise contained in the picture, $\sigma^+$ is a standard deviation of the difference values of the blocks having positive difference values of the blocks predetermined to contain no object, this value representing how variable the level of the noise contained in the picture is, and $K^+$ is an adjustable parameter and [R+] is a number of pixels contained in an area wherein the polarity $S_n$ is positive and no object exists.

Further, at the step 152, likewise, the threshold value th⁻ for the negative polarity Sn is derived by the following expression (6).

$$th^- = \mu^- + K^- \sigma^- \quad \ldots (6)$$

where $$\mu^- = \frac{\sum_{d \in R^-} \epsilon_d}{[R^-]} \sigma^- = \sqrt{\frac{\sum_{d \in R^-} (\epsilon_d - \mu^-)^2}{[R^-]}}$$

where $K^-$ is an adjustable parameter and [R⁻] is a number of pixels contained in an area having a negative polarity and no object.

At the steps 148 and 153 of calculating the similarity, for each block, the similarity $\gamma_n$ is calculated by the following expression (7).

$$\gamma_n = \frac{-\sum_{d \in D_n} \sum_{ij \in B} |(f_d(i, j) - f_d^-) - (r_d(i, j) - r_d^-)|}{[B] \cdot [D_n]} \quad (7)$$

where $D_n$ represents an area near an n-th block and [ ] represents a number of elements.

At steps 149 and 154 of determining the similarity, the adjustable parameters T⁺ and T⁻ are set as the threshold values for these steps. Based on these parameters, it is determined whether or not the similarity $\gamma_n$ is higher than the threshold value.

Concretely, at the determining step 149, the similarity $\gamma_n$ is compared with the threshold value T⁺. If the similarity $\gamma_n$ exceeds the threshold value T⁺, at the step 150, it is determined that the area that is lit by the lamp is sensed as indicated in FIG. 9D as the area 94 from which the light is reflected. Only if the similarity $\gamma_n$ is smaller than or equal to the threshold value T⁺ at the step 149, it is determined that the object is sensed at the step 151.

Likewise, at the determining step 154, the similarity $\gamma_n$ is compared with the threshold value $T^{31}$. If $\gamma_n$ exceeds the threshold value $T^{31}$, at the step 155, it is determined that the area that is made dark by the shadow of the object is sensed as indicated in FIG. 9E as the shadow area 96. Only if $\gamma_n$ is smaller than or equal to the threshold value $T^{31}$, at the step 156, it is determined that the object is sensed.

Then, when the object is sensed at the step 151 or 156, the CPU 126 operates to turn on the alarm lamp 130 through the output I/F 128 or display the picture on the monitor 131 through the picture output I/F 129 for reporting to the user that the object is sensed.

As mentioned above, the method according to this embodiment is capable of positively sensing only an object within the field of the imaging device. The concrete arrangement to which the method for sensing an object as shown in FIG. 13 will be described with reference to FIGS. 15 and 16.

Figure 15:
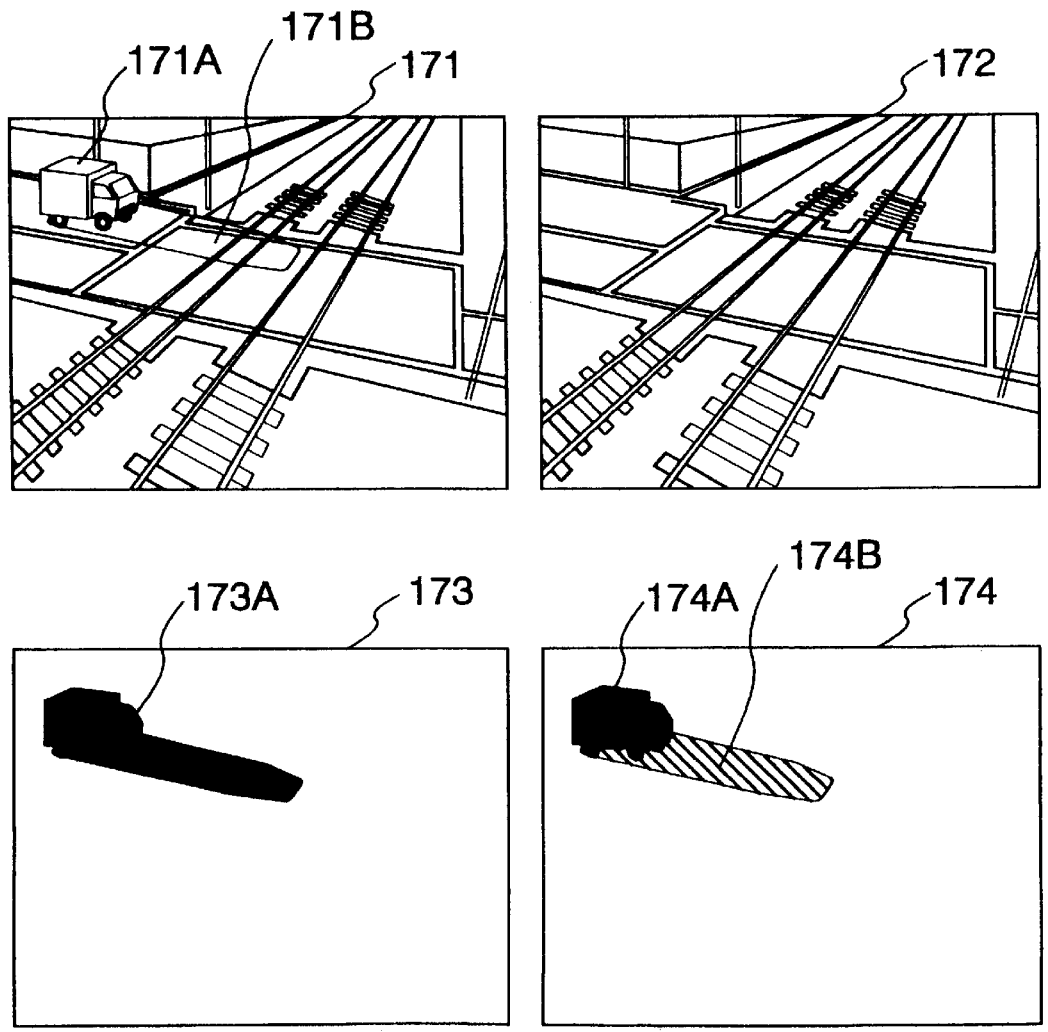
FIG. 15 is an explanatory view showing an example of an operation of sensing an object according to an embodiment of the present invention.

In FIG. 15, on an input picture 171, at dusk, a car 171A is stopped near a railroad crossing. The shadow 171B of the car 171A extends to the inside of the crossing. If this input picture 171 is determined by the conventional method, as indicated on a picture 173, it is erroneously determined that there exists an object 173A coming into the crossing.

On the other hand, according to the embodiment shown in FIG. 13, at first, the process shown in FIG. 14 is executed to obtain a reference background picture 172 and update it to a new background picture every about four seconds.

Next, since the portion of the shadow 171B makes the polarity data $S_n$ negative, the operation goes to the determining step 154 at which the similarity between the reference background picture 172 and the input picture 171 is determined.

In the area where the car 171A exists, since the car 171A hides a portion of the background, the similarity is not made so high. At the step 156 shown in FIG. 13, therefore, this area 171A is determined to actually have an object. On the contrary, in the area of the shadow 171B, nothing hides the background. Hence, the similarity is made high. As a result, at the step 155 of FIG. 13, it is determined that it is not an object but the shadow.

According to this embodiment, therefore, as shown by the picture 174, the car 174A is clearly distinguished from the shadow 174B, so that only an object coming into the crossing is positively sensed. In this case, though the shadow 174B appears, it is determined that no object comes into the crossing.

Figure 16:
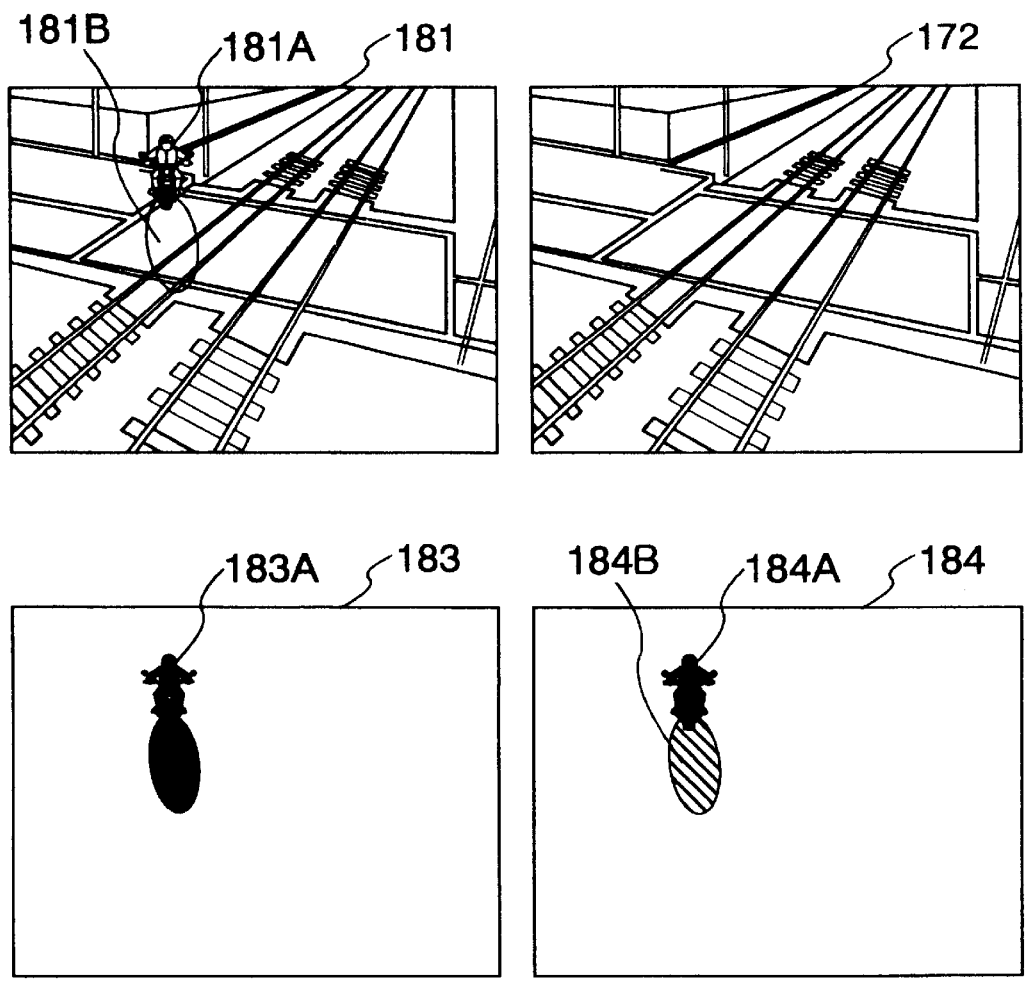
FIG. 16 is an explanatory view showing an example of an operation of sensing an object according to an embodiment of the present invention.

Next, FIG. 16 shows an input picture 181 where a ray of light 181B applied by a head lamp of a motorcycle 181A is intruded into the railroad crossing before the motorcycle enters into the crossing. In this case, if the input picture 181 is determined by the conventional method, as shown by the picture 183, it is erroneously determined that there exists an object 183A coming into the crossing.

On the other hand, according to the embodiment shown in FIG. 13, at first, the process shown in FIG. 14 is executed to obtain a reference background picture 172 and update it to a new picture every about four seconds.

Next, since the polarity data $S_n$ is positive in the ray of light 181B applied by the head lamp, the operation goes to the step 149 of determining the similarity. At this step 149, it is determined whether or not the similarity between the latest reference background picture 172 and the input picture 181 is high.

In the area where the motorcycle 181A exists, since the motorcycle 181A hides a portion of the background, the similarity is not made so high. Hence, at the step 151, it is determined that there exists an object. On the other hand, in the area of the ray 181B, since it does not hide any portion of the background, the similarity is made high. As a result, at the step 150, it is determined that it is not an object but a mere bright portion.

According to this embodiment, therefore, as shown by the picture 184, the motorcycle 184A and the ray applied from its head lamp are clearly distinguished from each other as the objects 151 and 150 shown in FIG. 13. It means that only the object coming into the railroad crossing can be positively sensed. In this case, though the portion of the ray 184B appears, it is determined that there exists no object coming into the railroad crossing.

Next, the description will be oriented to a method according to another embodiment of the present invention.

The arrangement of this embodiment is application of the present invention to monitoring a pyroclastic flow in an active volcano. In the apparatus for monitoring a picture as shown in FIG. 12, an infrared TV camera (infrared imaging device) is used for the camera 121. The infrared TV camera yields the input picture on which a luminance is made larger in a warmer portion of an object. In the system shown in FIG. 12, the CPU 126 executes the process shown in FIG. 17.

Figure 17:
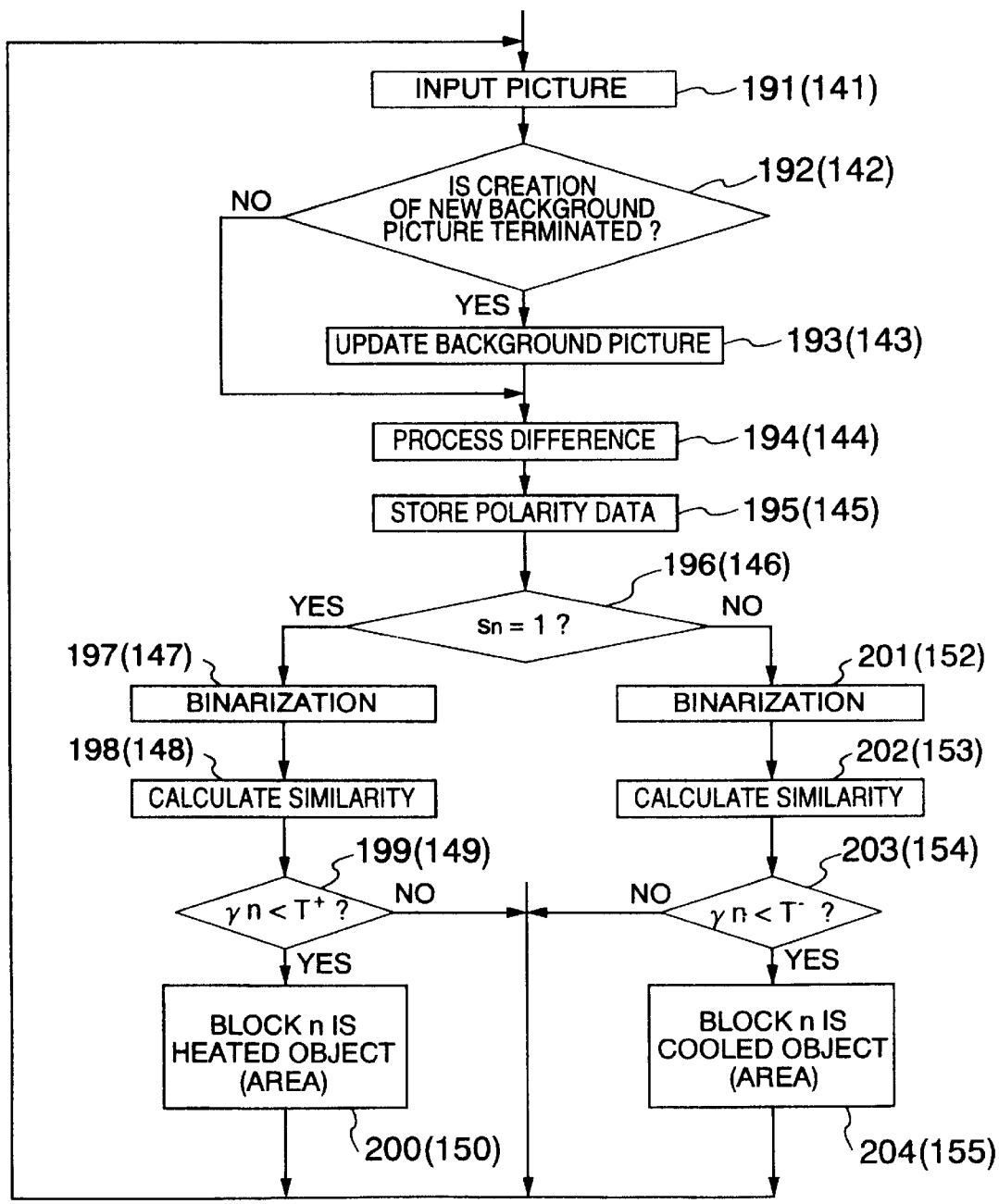
FIG. 17 is a flowchart showing an embodiment in which the present invention is applied to a system for monitoring a pyroclastic flow.

In FIG. 17, as depicted in brackets, the routines from steps 191 to 199 and from steps 201 to 203 are the same as those from the steps 141 to 149 and from the steps 152 to 154 shown in FIG. 13. Hence, these routines will be briefly described. The processing operation goes to any one of the step 199 of determining the similarity and the step 203 of the same function, depending on the luminance, that is, the polarity of the difference of the temperature between the input picture and the reference background picture. At the steps 199 and 203, the adjustable parameters $T^+$ and $T^{31}$ are used as the threshold values for determining the similarity. If an area has a positive polarity and a similarity that is smaller than or equal to the threshold value, at the step 200, it is determined that the area (object) has a higher temperature. If the area has a negative polarity and a similarity that is smaller than or equal to the threshold value, at the step 204, it is determined that the area (object) has a lower temperature.

The operation of the method according to this embodiment will be described with reference to FIG. 18. An input picture 211 is a picture captured at an instance when a pyroclastic flow takes place. A numeral 212 denotes a reference background picture.

Figure 18:
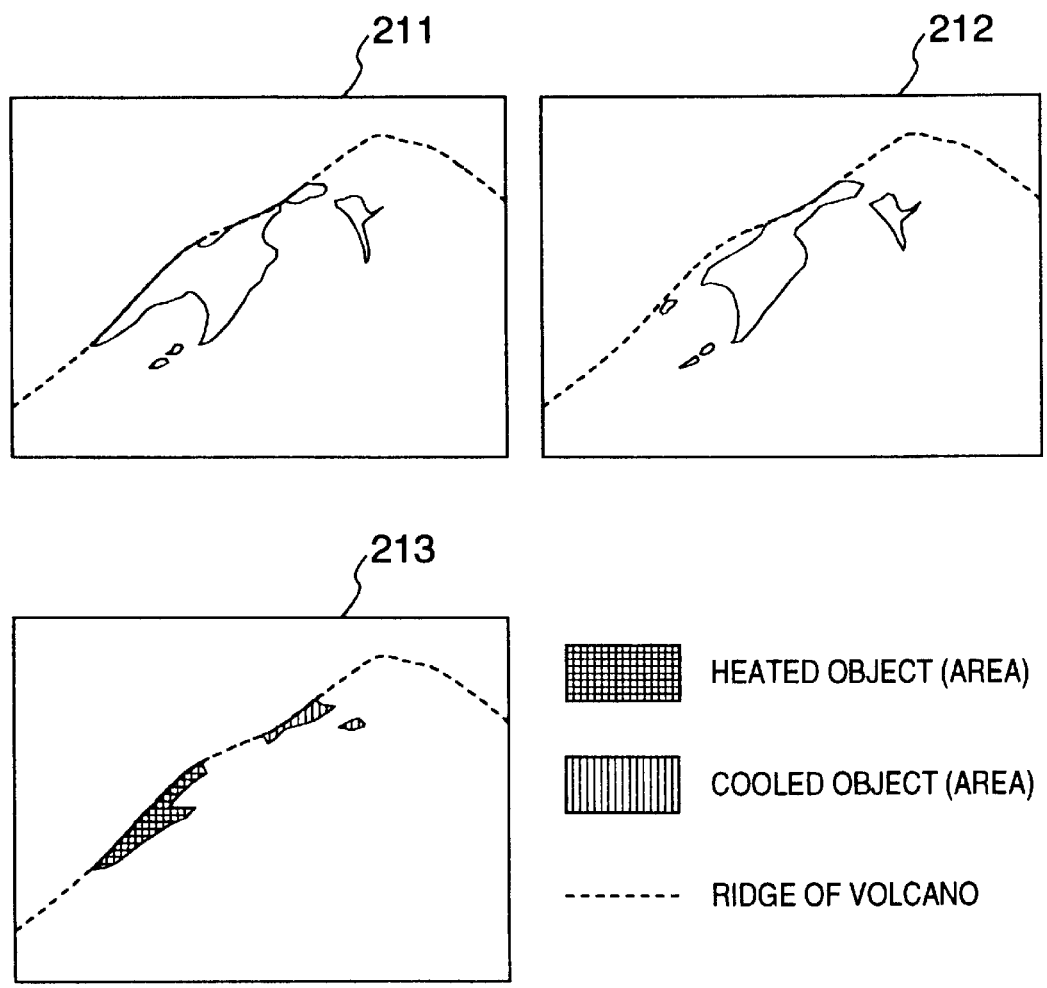
FIG. 18 is an explanatory view showing an example of a sensing operation executed by the embodiment in which the present invention is applied to a system for monitoring a pyroclastic flow.

Then, after the process of FIG. 17 is executed for the picture shown in FIG. 18, the resulting picture is made to be the picture 213. On this picture, a portion whose temperature is made higher by the pyroclastic flow is allowed to be positively distinguished from the portion whose temperature is made lower after the pyroclastic flow is flown out.

That is, since the difference of the luminance distribution pattern takes place between the area whose local temperature is higher and the other areas whose temperatures keep stable, the similarity of the form of the luminance distribution is made lower.

In the portion where a lava dome is formed by the pyroclastic flow, the local temperature abruptly goes up. Hence, the similarity is made lower. On the other hand, for example, in the clouds that are made warmer by the pyroclastic flow, the whole temperature uniformly goes up. Hence, the similarity is made higher.

Hence, the addition of the step 199 of estimating the similarity makes it possible to clearly distinguish the area (pyroclastic flow) whose temperature goes up from the other area at the step 200 if there exist portions such as the heated clouds.

On the other hand, in the area whose local temperature goes down, the difference of the luminance distribution pattern takes place between that area and the area whose temperature keeps stable. Hence, the similarity of the pattern of the luminance distribution is made lower.

If the lava dome collaspes, it means that the heat source is dropped. The temperature of the relevant area is made abruptly lower. Hence, the area is made to have a lower similarity. On the other hand, in the area such as the clouds heated by the pyroclastic flow, if the heat applied by the heat source is reduced, the overall area is substantially uniformly cooled down, that is, its temperature uniformly goes down. Hence, the similarity is made higher.

The addition of the step 203 of estimating the similarity, therefore, makes it possible to clearly distinguish the area whose temperature is made lower (pyroclastic flow is flown out) from the other area at the step 204 if there exist portions such as the clouds whose temperature is made lower. It means that the cooled area can be distinctly sensed.

In addition, it goes without saying that the present invention is not limited to the above-mentioned application but may be applicable to another system such as a system for monitoring an intruder to a prohibited zone such as plant facilities.

According to the embodiment as described above, the sign of the difference value is used for overcoming the conventional shortcoming of the erroneous sensing resulting from the change of the background caused by the variation of illuminance. This thus makes it possible to lower the adverse effect caused by the change of the environment such as change of illuminance of the monitoring field, thereby being able to accurately sense an object. Further, the similarity of the pattern of the luminance distribution is used for determining how much of degree the patterns are saved. Hence, if a phantom area caused by the change of the illuminance takes place though no actual object exists, such an area is allowed to be positively distinguished from an actual object when sensing an object.

As noted above, the method according to the present invention may be reliably applied to such an area as requiring high reliance like a railroad crossing. It means that this method may make great contribution to widening the applied field of the apparatus for monitoring a picture.

In the embodiment as described above, for generating the reference background picture, the method shown in FIG. 14 as well as another method may be used. The reference background picture may be produced for calculating a median of plural picture frames as well as calculating an average value of plural frames though the latter method needs more frames. Moreover, another statistical method may be used therefor. A method for generating a reference background picture by calculating a median will be described below with reference to the drawings.

Figure 19:
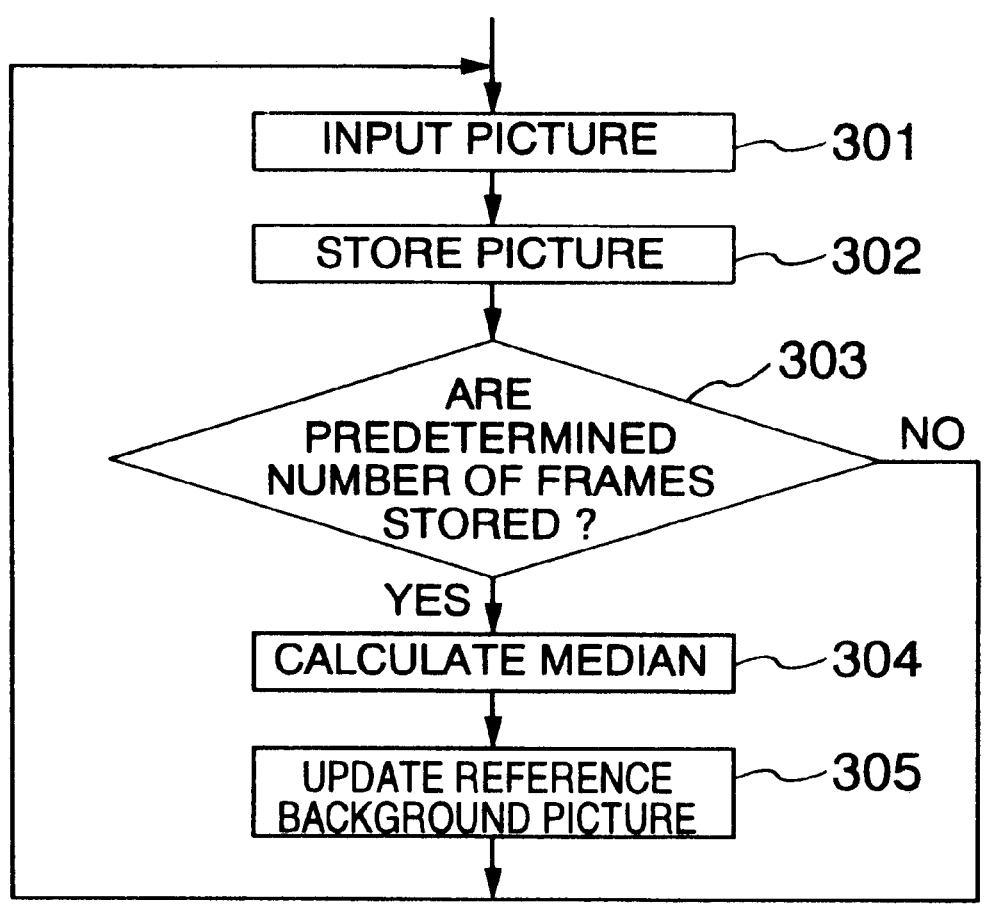
FIG. 19 is a flowchart for describing an operation of creating and updating a reference background picture according to a first embodiment of the present invention.

The method according to the embodiment shown in FIG. 19 includes the step 301 of receiving a picture, a step 302 of storing the picture, a step 303 of determining whether or not a predetermined number of frames have been saved, a step 304 of calculating a median for each pixel of the picture saved when the storage for the predetermined number of frames is terminated, and a step 305 of updating the picture calculated at the step 304 to a new reference background picture.

In FIG. 19, at the step 301, the picture is read from the TV camera at a rate of 30 frames per second or a higher sampling rate. Then, the read picture is stored in the memory at the step 302.

Afterwards, if, at the step 303, the number of the stored frames reaches a predetermined number N (N is a positive integer), at the step 304, a median value of a luminance for each pixel is calculated on the picture signal for the stored N frames. Then, at the step 305, the picture composed to have the median value as the luminance of each pixel is updated to a new reference background picture and then saved in the memory.

As this result, the method of this embodiment is capable of positively securing a quite exact reference background picture without having to set a large value as the frame number N (for example, N=300). The ground will be described below.

Remarking a pixel (x, y) of the picture whose N frames are stored, the N frames are ranged in numerical order. The change of the luminance of the pixel is made to be as shown by 310 in FIG. 20A. Herein, (x, y) represents a pixel location (coordinates) within a frame. It means that the picture data composed of 320×240 pixels has the values of x=1 to 320 and y=1 to 240.

Next, about the pixel (x, y) at one location, a median value of the luminance is calculated. The sentence "a median value of the luminance is calculated" means that pieces of data ranged in an order are rearranged in order of magnitude from a smaller to a larger (ascending order) or from a larger to a smaller (descending order), so as to select a central value at the middle of the order.

Figure 20A:
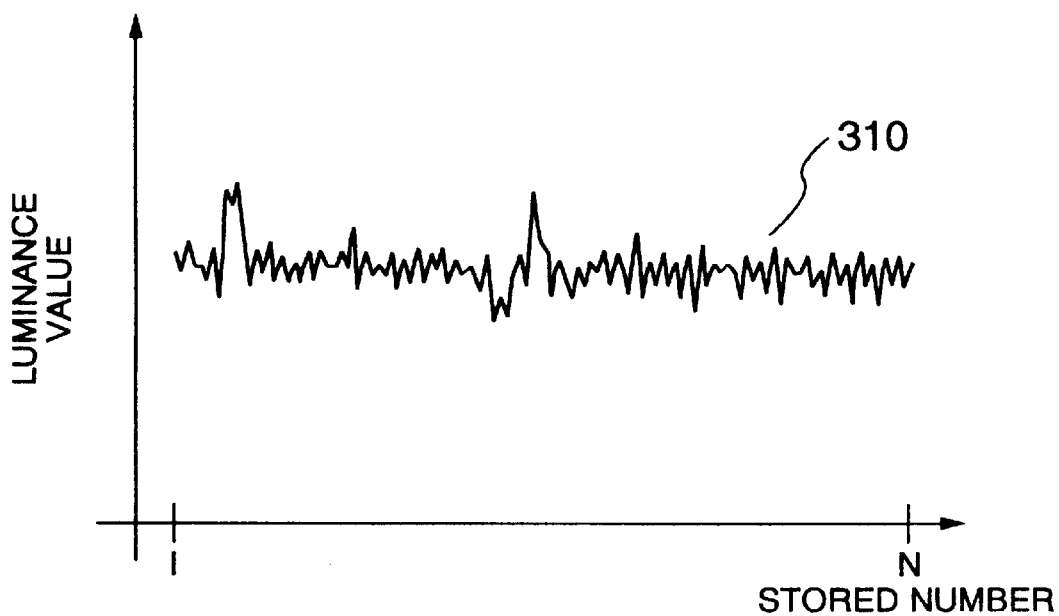
FIGS. 20A and 20B are diagrams for describing an effect caused by calculation of a median of pixel luminance values.
Figure 20B:
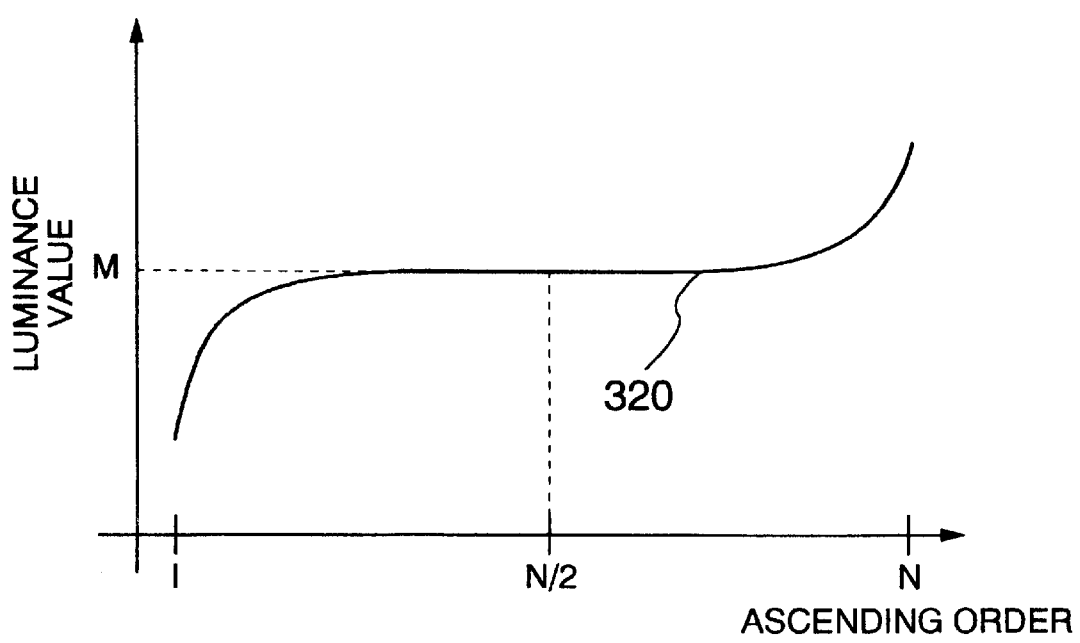

As a result of calculating a median of the luminance of each pixel as shown in FIG. 20A, the distribution as shown by a characteristic 320 in FIG. 20B takes place. The median value of the pixel (x, y) is the N/2-th luminance value M, that is, a median value M.

If no change of the picture takes place over N frames, the luminance value of the same pixel of each frame is made equal to the median value M. In this case, the characteristic 320 is made to be a horizontal line.

Then, assume that an object is caught or any noise is mingled on L frames (1<L<N) of the stored N frames though the object or noise is not on the other frames rather than the L frames. The pixels composing the object or the pixels mingled with the noise is made to have a different luminance value from the pixels of the picture that does not suffer from any change, that is, a different median value M therefrom. By rearranging the luminance values of the pixels at the same location of the N frames in descending order, if the frame number L is equal to or smaller than N/2, the pixel is located at both ends of the characteristic 320 of FIG. 20B spaced from the center location (N/2).

When the luminance values of the pixels composing the object or mingled with noise are smaller than those of these pixels that do not suffer from any change, the pixels are located in the left hand (toward a value of 1) from the center location (N/2). Conversely, when the former is larger than the latter, the pixels are located in the right hand (toward a value of N) from the center location (N/2).

As the number L of the frames where an object or any noise is caught is made greater, the pixels appearing close to the center location (N/2) is made more numerous. While the frame number L is N/2 or less, no substantial influence effect is applied to the median value M.

That is, the influence applied by the object or any noise takes place in the area around the center location (N/2) close to the median value M only when the pixels where the object or any noise is caught stay at the same location over at least a half of a number N of stored frames.

In principle, however, a moving object or noise is quickly moved or disappears. It means that the number of frames where the object or noise is caught is not so great.

Hence, by calculating a median value, the influence of the moving object or noise may be restricted without having to read so many frames N. This calculation of the median value makes it possible to obtain a quite exact reference background picture. In addition, the calculation of the median value just needs a half or less of the stored frames if an object is caught in some of the frames. Hence, by lowering a sampling rate, the frames to be stored may be reduced in number.

Figure 21:
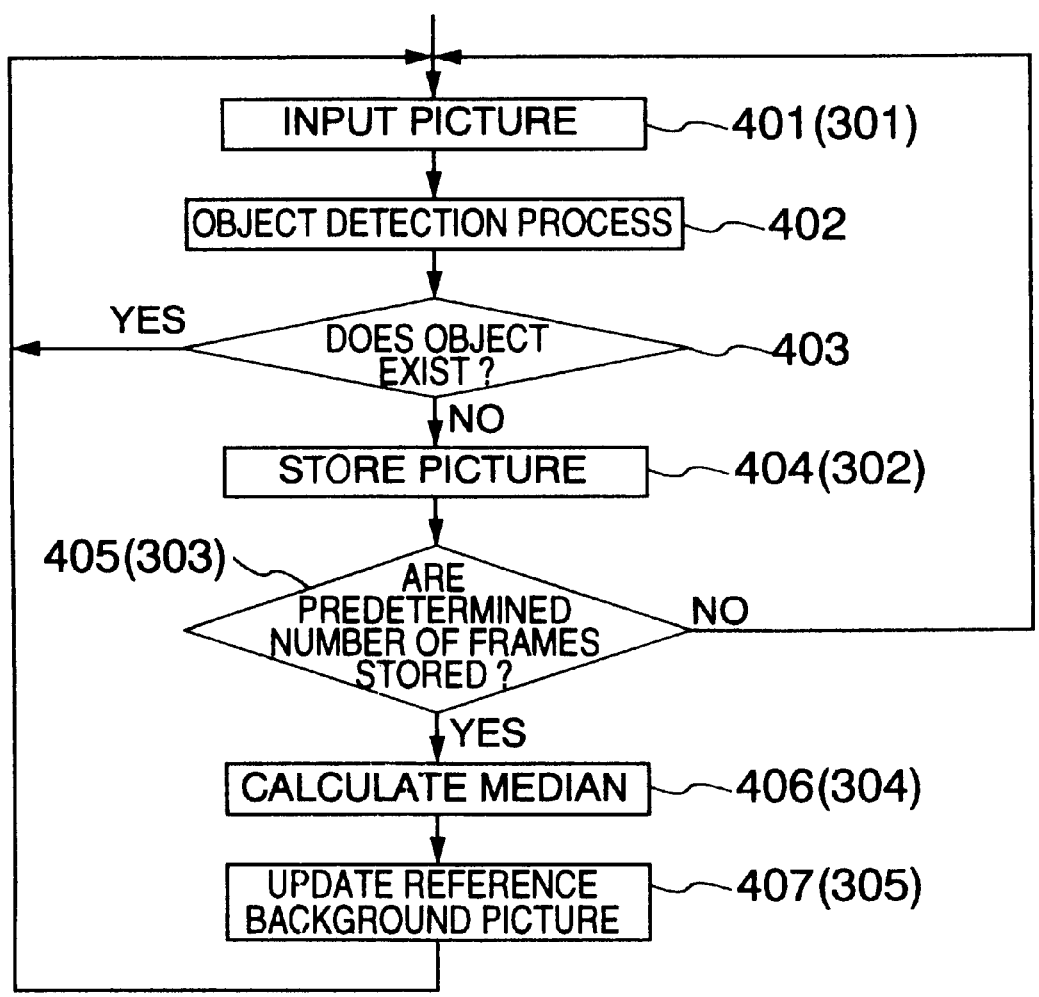
FIG. 21 is a flowchart for describing an operation of creating and updating a reference background picture according to a second embodiment of the present invention.

Next, the method according to another embodiment of the invention shown in FIG. 21 is arranged to add an object sensing step 402 and a determining step 403 after the step 401 of receiving a picture. After it is determined whether or not an object exists at the steps 402 and 403, the same process as described about the method of the embodiment shown in FIG. 19 is executed only for the picture that is determined to have no object. In addition, the description about the processes at the steps 401 and 404 to 407 is left out, because those processes are the same as those at the steps 301 to 305. At the step 402, by using a differential calculation, it is determined whether or not an object comes into an imaging field. Then, the picture that is determined to have no object at the step 403 is stored in the memory at the step 404. Next, if the number of stored frames reaches the predetermined number, the processes at the step 406 of calculating a median value and the step 407 are executed to calculate a median value (step 406) and update a reference background picture (step 407).

According to this embodiment, therefore, it is guaranteed at the step 403 that a new background picture used for updating the reference background picture at the step 407 does not have any object coming into the picture. This thus makes it possible to greatly reduce the number N of frames required for calculating a median value to a small value such as N=6 as compared to the value used in the embodiment shown in FIG. 19.

Figure 22:
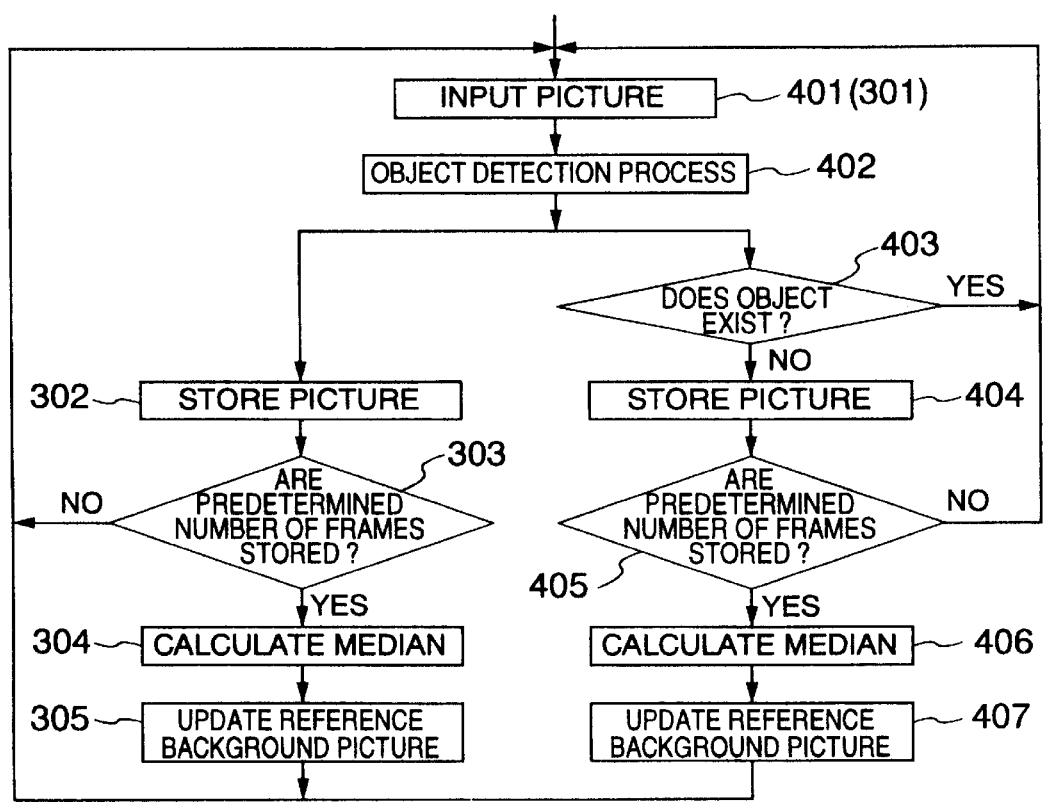
FIG. 22 is a flowchart for describing an operation of a method for sensing an object according to an embodiment of the present invention.

Next, in the method according to another embodiment shown in FIG. 22, the processes done by the embodiments shown in FIGS. 19 and 21 are allowed to be executed in parallel. At the steps 305 and 407, that is, two-system processes of updating a reference background picture, the method of this embodiment is capable of constantly yielding the latest reference background picture.

In the embodiment shown in FIG. 19, the number of frames to be stored is about 300, which is far more numerous than that of the embodiment shown in FIG. 21. Hence, the interval for updating the reference background picture is made considerably wide. It means that the freshness of the reference background picture is not necessarily satisfactory.

On the other hand, in the embodiment shown in FIG. 21, if yes at the step 403 of determining whether or not an object exists, the process at the step 407 of updating a reference background picture is not executed. In this case, it is possible to make no use of such a special advantage as reducing the necessary number of frames.

The method according to the embodiment shown in FIG. 22, however, can make use of both advantages of the embodiments shown in FIGS. 19 and 21 and allow the processes for these embodiments to use the corresponding latest reference background picture. Hence, the reference background picture can be made more exact.

FIG. 23 shows a series of processes from a process of creating a reference background picture to a process of sensing an object, which processes are executed by the CPU 126 in the system shown in FIG. 12. This embodiment is based on the method shown in FIG. 19.

At a step 501 of reading a picture, a video signal is read as picture data consisting of 320×240 pixels from a TV camera 121. Then, at a step 502 of storing a picture, the picture data is stored in a picture memory 124.

At a determining step 503, if the number of the frames being stored reaches a predetermined value $N_1$ (for example, $N_1$=300=N), the operation is branched into a step 504 of calculating a median. If it does not reach the value $N_1$, the operation is branched into a step 506 of sensing an object.

At the step 504 of calculating a median, the process is executed to rearrange the stored N frames as shown in FIG. 20B for each pixel and calculate a median value M by the following expression (8).

$$r(x, y) = \underset{1 \leq i \leq 300}{\text{med}} \{f^{(i)}(x, y)\} \tag{8}$$

where $f^{(i)}(x, y)$ represents the picture data composed of 300 frames and i takes a value of i=1, 2, . . . , 300. In addition, the expression (8) is the same as the case that the number N of the frames in the expression (1) is 300.

At the step 505, the median value derived at the step 504 is stored in a storage area for the reference background picture allocated to the picture memory 124.

Next, at the step 506, the process is executed to derive a difference between the picture data read at the step 501 and the reference background picture stored in the storage area of the picture memory 124. If the picture data has a portion with a larger difference than a predetermined threshold value, the portion is sensed as an object.

Figure 24A:
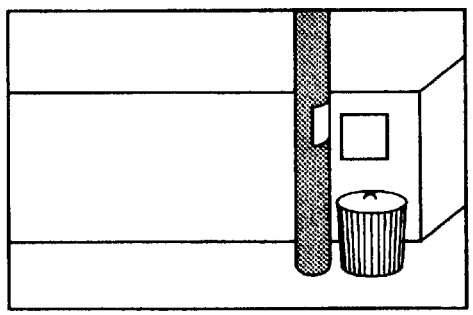
FIGS. 24A, 24B, 24C and 24D are explanatory views showing an operation of sensing an object through the effect of the differential calculation according to an embodiment of the present invention.
Figure 24B:
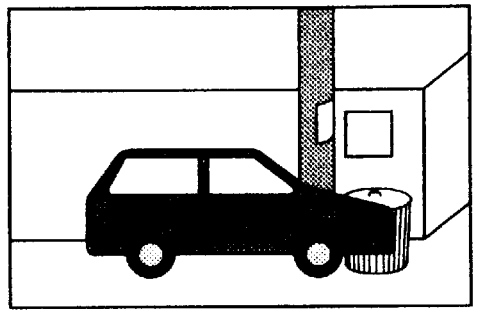
Figure 24C:
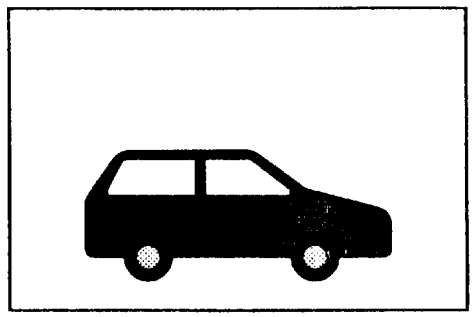
Figure 24D:
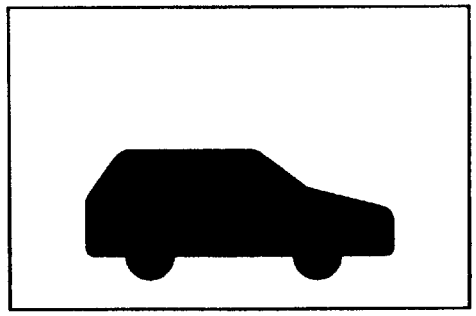

At first, the reference background picture as shown in FIG. 24A is compared with the picture containing an object to be sensed as shown in FIG. 24B. At each pixel located at the same coordinates of both of the pictures, the difference of the luminance is derived. The picture composed on the difference value is made to be as shown in FIG. 24C. Then, the difference value is given a predetermined threshold value and then is made binarized. As a result, the picture shown in FIG. 24D is extracted.

On the other hand, if no object exists, it does not appear as the extracted picture. Hence, only the object is allowed to be sensed.

At a step 507, it is determined whether or not an object exists based on the result given at the step 506. If any object exists, at a step 508, an alarm is issued. If no object exists, the operation is branched into the step 501 of reading a picture.

Figure 25:
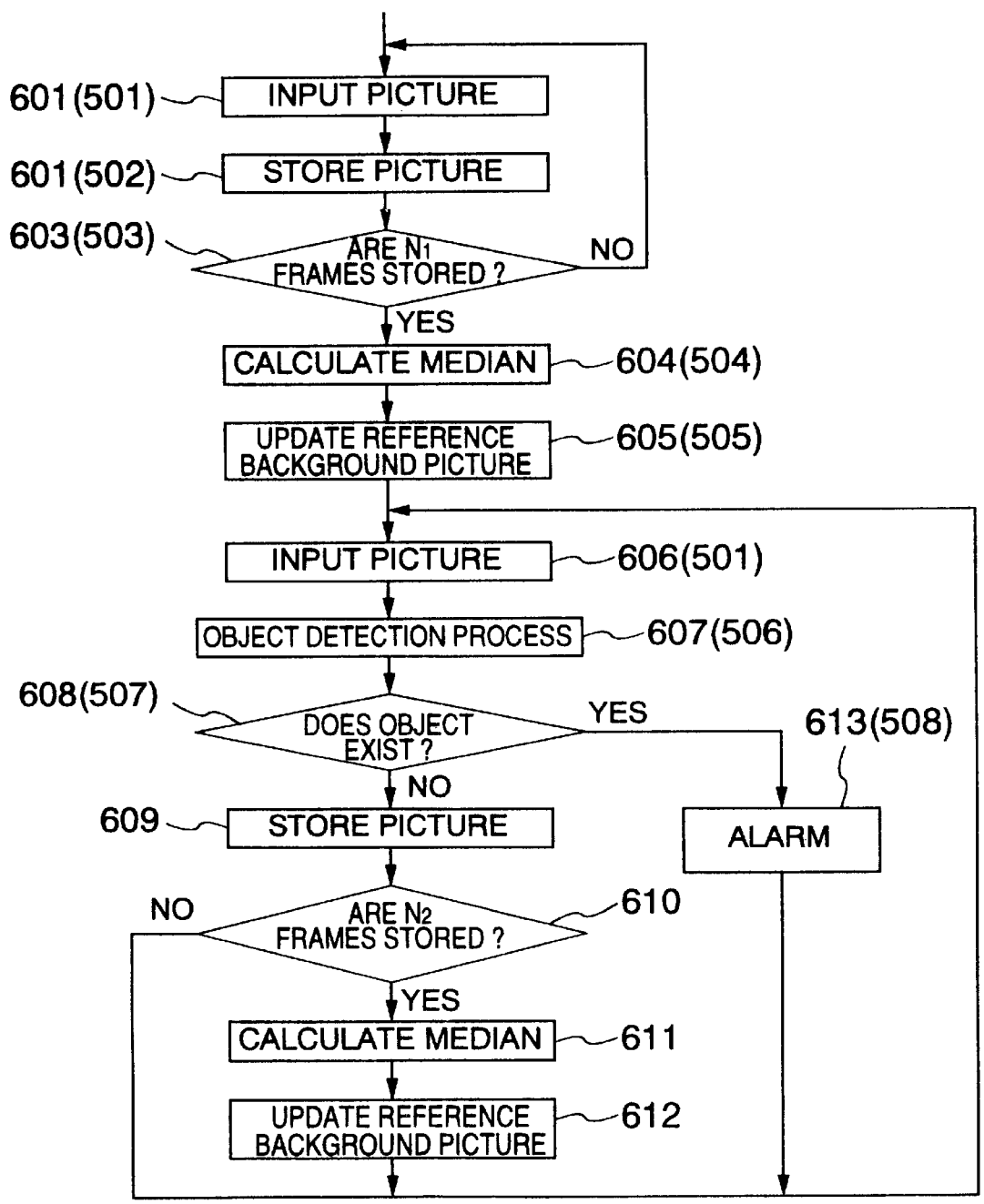
FIG. 25 is a flowchart for describing an operation of sensing an object according to another embodiment of the present invention.

In turn, FIG. 25 shows an applied one of the method described with reference to FIG. 21. Each figure in brackets of FIG. 25 indicates the step of another Figure at which the same process as the figure-attached step is executed.

In the embodiment shown in FIG. 25, the processes at the steps 601 to 605 the same as those at the steps 501 to 505 in FIG. 23. Hence, the description about these steps is left off this specification.

At the step 606, like the step 601, the video signal is read as the picture data consisting of 320×240 pixels from the TV camera 121 to the picture memory 124.

At a step 607 of sensing an object, if a new reference background picture is created at a step 612, the new one is used. If not, a reference background picture created at the step 605 is used for sensing an object.

At a step 608, if it is determined that no object exists at the step 607 of sensing an object, the operation is branched to a step 609, while if it is determined that any object exists, the operation is branched to a step 613.

If it is determined that no object exists, at the step 609, the picture obtained at the step 606 is stored in the memory.

At a determining step 610, if the number of frames being stored reaches a predetermined number $N_2$ (for example, $N_2$=6), the operation is branched to a step 611 of calculating a median value. If the number does not reach the predetermined value $N_2$, the operation is branched to a step 606 of reading a picture.

At the step 611 of calculating a median value, the operation is executed to rearrange the predetermined number $N_2$ of the stored frames as shown in FIG. 20 for each pixel and calculate a median value by the above-indicated expression (8).

The median value derived at the step 611 is stored in a storage area for a reference background picture allocated to the picture memory 124 at a step 612.

Figure 26:
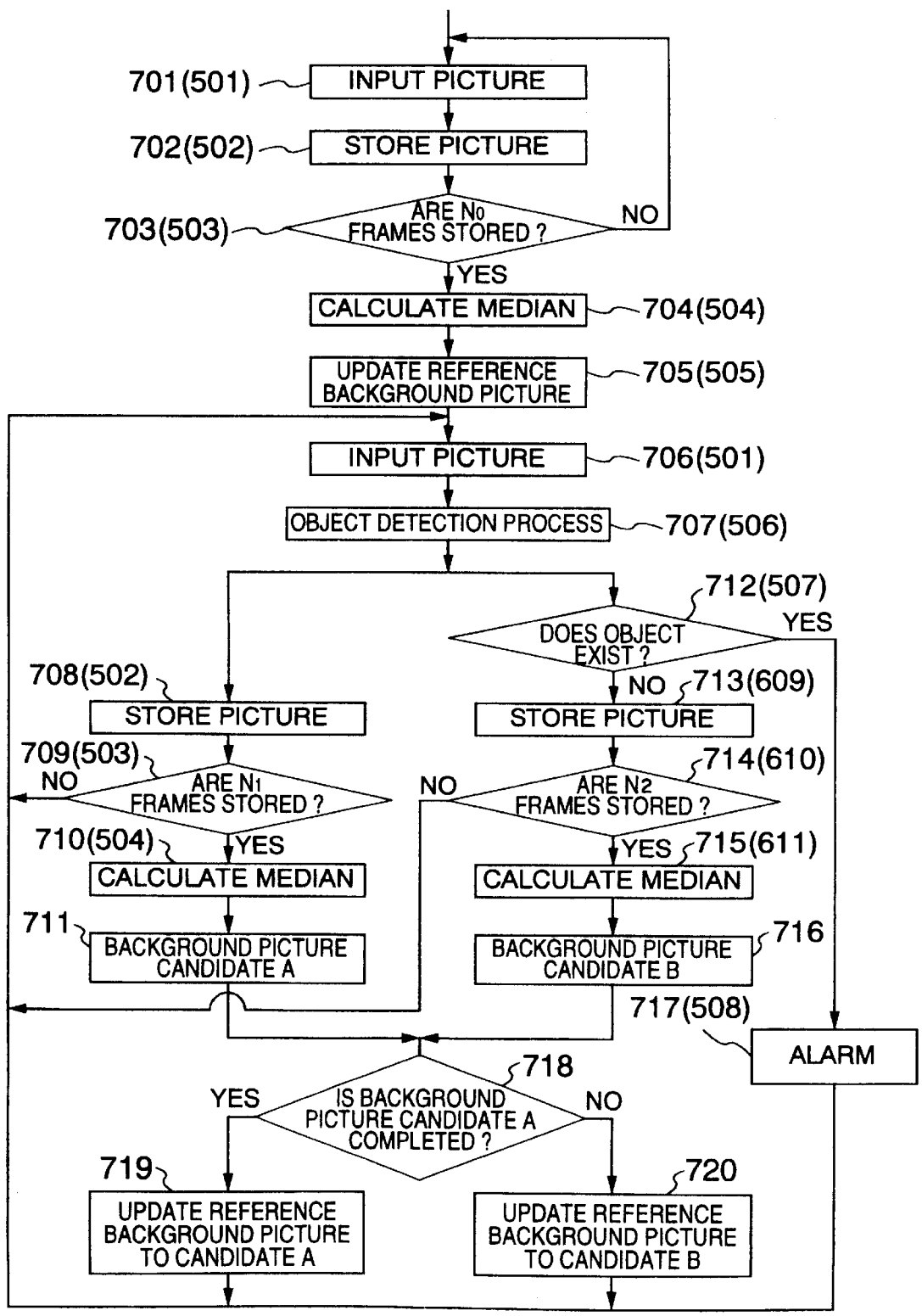
FIG. 26 is a flowchart for describing an operation of sensing an object according to yet another embodiment of the present invention.

FIG. 26 shows an applied one of the method described with reference to FIG. 22.

The processes at the steps 701 to 705 are the same as the steps 501 to 505 of FIG. 23. Hence, the description about these processes is left off the specification.

In succession, at a step 706, the process of reading a picture is executed. This is the same as the process of the step 501. And, at a step 707, the process of sensing an object is executed. This is the same as the process of the step 506. Then, a first and a second systems of processes are executed in parallel. The first system of process is the same as the method shown in FIG. 19. The second system of process is the same as the method shown in FIG. 21.

The processes of steps 708 to 710 corresponding to the first system of process are the same as the processes of the steps 502 to 504 shown in FIG. 23. Next, the processes of steps 712 to 715 and 717 corresponding to the second system of process are the same as the processes of the steps 608 to 611 shown in FIG. 25. Hence, the description about those steps is not left off the specification. In step 711, a picture obtained by the first system of the process is taken as a candidate A of the reference background picture. In step 716, a picture obtained by the second system of the process is taken as a candidate B of the reference background picture.

At steps 718, 719 and 720, the processes are executed to select an earlier one of a reference background picture A obtained at the step 711 for the first system of process and a reference background picture B obtained at the step 716 for the second system of process and replace the previous reference background picture stored in the memory with the selected one. A number $N_0$ of frames read at the step 703, a number $N_1$ of frames read at the step 709, and a number $N_2$ of frames read at the step 714 are set to have the relation of $N_0 \geq N_1 \geq N_2$. If the relation of $N_0 > N_1 > N_2$ is set, a proper number of frames to the imaging condition are sampled so that an object may be efficiently sensed. For example, a recommended value of $N_0$ is $N_0 = 500$.

In turn, the description will be oriented to the sensing results given by those embodiments with reference to FIG. 27.

In FIG. 27, a picture 801 is an example of picture data that is taken by the TV camera 121 (see FIG. 12) and read at the picture reading step 501.

For such a picture, according to the embodiment shown in FIG. 23, unless a truck in the picture stays at one site for about five or more seconds (N=300 at a frame frequency of 60 Hz), an exact reference background picture where no object (truck) appears can be positively obtained as shown by the picture 802 of FIG. 27.

In the embodiments shown in FIGS. 25 and 26, unless the object is erroneously sensed for at least three frames, as shown by the picture 802 of FIG. 27, an exact reference background picture where no object (truck) appears can be obtained.

According to the above-mentioned embodiments, therefore, if the frames required for creating the reference background picture are reduced in number, the exact reference background picture can be positively obtained. Hence, even in the conditions like an outdoor place where an environmental change such as variable illuminance, the latest reference background picture with little delay may be used for sensing an object. This makes it possible to offer a highly reliable monitoring system.

In addition to the above-mentioned applications, the present embodiment may be applicable to a system for monitoring an intruder to plant facilities or prohibitive zones.

According to the present embodiment, the calculation of a median is used for creating the reference background picture. Hence, the method of this embodiment can overcome the drawback the conventional technique of creating the reference background picture has involved and is endurable in light of noise. Further, the method of this embodiment needs a smaller number of frames for creating the reference background picture as compared with the method arranged to take an average of each pixel therefor. Hence, the method of this embodiment offers a highly reliable monitoring system with the latest reference background picture.

In addition, an object sensing method according to the present invention may use luminance data as well as color data of the video signal.

What is claimed is:

1. An apparatus for sensing an object within an imaging field of an image pickup device, the apparatus comprising:

a memory for storing data of a reference background picture of the imaging field;

means for inputting picture data from the image pickup device;

means for comparing the inputted picture data with the stored reference background picture data to detect a difference value between the inputted picture data and the stored reference background picture data, and to detect a polarity of the difference value;

a converter for converting the difference value into binarization data based on a difference threshold value which is changed in response to the polarity of the difference value so that an object within the imaging field can be distinguished from an area of increased brightness within the imaging field and an area of increased darkness within the imaging field;

a calculator for calculating a similarity between the inputted picture data and the stored reference background picture data; and a detector for sensing whether an object is within the imaging field based on the polarity of the difference value and the similarity.

2. An apparatus as claimed in claim 1, wherein the converter includes a first converter which converts the difference value into first binarization data based on a first difference threshold value if the polarity of the difference value is positive so that an object within the imagine field can be distinguished from an area of increased brightness within the imaging field, and a second converter which converts the difference value into second binarization data based on a second difference threshold value if the polarity of the difference value is negative so that an object within the imaging field can be distinguished from an area of increased darkness within the imaging field; and wherein the detector senses whether an object is within the imaging field based on the first binarization data, the second binarization data, and the similarity.

3. An apparatus as claimed in claim 1, wherein the detector senses whether an object is within the imaging field by comparing the similarity with a similarity threshold value which is changed in response to the polarity of the difference value so that an object within the imaging field is distinguished from an area of increased brightness within the imaging field and an area of increased darkness within the imaging field.

4. A method of sensing an object within an imaging field of an image pickup device, the method comprising the steps of:

storing data of a reference background picture of the imaging field;

reading out picture data from the image pickup device;

comparing the read-out picture data with the stored reference background picture data to detect a difference value between the read-out picture data and the stored reference background picture data, and to detect a polarity of the difference value;

converting the difference value into binarization data based on a difference threshold value which is changed in response to the polarity of the difference value so that an object within the imaging field can be distinguished from an area of increased brightness within the imaging field and an area of increased darkness within the imaging field;

calculating a similarity between the read-out picture data and the stored reference background picture data; and sensing whether an object is within the imaging field based on the polarity of the difference value and the similarity.

5. A method as claimed in claim 4, wherein the converting step includes the steps of converting the difference value into first binarization data based on a first difference threshold value if the polarity of the difference value is positive so that an object within the imaging field can be distinguished from an area of increased brightness within the imaging field, and converting the difference value into second binarization data based on a second difference threshold value if the polarity of the difference value is negative so that an object within the imaging field can be distinguished from an area of increased darkness within the imaging field; and wherein the sensing step includes the step of sensing whether an object is within the imaging field based on the first binarization data, the second binarization data, and the similarity.

6. A method as claimed in claim 4, wherein the step of storing the reference background picture data includes the steps of:

reading out a predetermined number of frames of picture data from the image pickup device during a predetermined period;

calculating median picture data of the predetermined number of frames of picture data read out from the image pickup device; and updating the stored reference background picture data with the median picture data.

7. A method as claimed in claim 6, wherein the predetermined number of frames of picture data read out from the image pickup device during the predetermined period is smaller than a total number of frames produced by the image pickup device during the predetermined period.

8. A method as claimed in claim 6, wherein a period at which each of the predetermined number of frames of picture data is read out from the image pickup device is longer than a period at which the image pickup device produces one frame of picture data.

9. A method as claimed in claim 6, wherein the sensing step includes the step of issuing an alarm if an object is sensed; and wherein the step of updating the stored reference background picture data includes the step of updating the stored reference background picture data if an object is not sensed in the sensing step.

10. A method as claimed in claim 6, wherein the step of reading out the predetermined number of frames of picture data includes the steps of reading out N1 frames of picture data from the image pickup device, N1 being a positive integer of at least two, and reading out N2 frames of picture data from the image pickup device if an object is not sensed in the sensing step, N2 being a positive integer of at least two, N2 being less than N1;

wherein the step of calculating median picture data includes the steps of calculating first median picture data of the N1 frames of picture data; and calculating second median picture data of the N2 frames of picture data; and wherein the step of updating the stored reference background picture data includes the step of replacing the stored reference background picture data with any one of the first median picture data and the second median picture data.

11. A method as claimed in claim 6, wherein the step of updating the stored reference background picture data includes the step of updating the stored reference background picture data with the median picture data when an object is not sensed in the sensing step.

12. A method as claimed in claim 4, further comprising the step of updating the stored reference background picture data when the object is not sensed.

13. A method as claimed in claim 4, wherein the sensing step includes the step of sensing whether an object is within the imaging field by comparing the similarity with a similarity threshold value which is changed in response to the polarity of the difference value so that an object within the imaging field is distinguished from an area of increased brightness within the imaging field and an area of increased darkness within the imaging field.

14. A method of sensing an object within an imaging field of an image pickup device, the method comprising the steps of:

storing data of a plurality of pixels of a reference background picture of the imaging field;

reading out picture data of a plurality of pixels from the image pickup device;

comparing the data of the pixels of the read-out picture data with the data of corresponding ones of the pixels of the stored reference background picture data to detect respective difference values between the data of the pixels of the read-out picture data and the data of the corresponding one of the pixels of the stored reference background picture data, and to detect respective polarities of the difference values;

converting the difference values into respective binarization data based on a difference threshold value which is changed in response to the respective polarities of the difference values so that an object within the imaging field can be distinguished from an area of increased brightness within the imaging field and an area of increased darkness within the imaging field;

calculating respective similarities between the pixels of the read-out picture data and the corresponding one of the pixels of the stored reference background picture data; and sensing whether an object is within the imaging field based on the polarities of the difference values and the similarities.

15. A method as claimed in claim 14, wherein the calculating step is performed after the converting step.

16. A method as claimed in claim 15, wherein the sensing step includes the steps of:
comparing the similarities with a similarity threshold value; and
sensing that an object is within an area of the imaging field where pixels have respective similarities which are not greater than the similarity threshold value.

17. A method as claimed in claim 15, wherein the sensing step includes the steps of:
comparing the similarities with a similarity threshold value; and
sensing that an object is not within an area of the imaging field where pixels have respective difference values having a positive polarity, and have respective similarities which are greater than the similarity threshold value.

18. A method as claimed in claim 15, wherein the sensing step includes the steps of:
comparing the similarities with a similarity threshold value; and
sensing that an object is not within an area of the imaging field where pixels have respective difference values having a negative polarity, and have respective similarities which are greater than the similarity threshold value.

19. A method as claimed in claim 15, wherein the sensing step includes the steps of:
comparing the similarities with a similarity threshold value; and
distinguishing an area of the imaging field where pixels have respective similarities which are greater than the similarity threshold value from an area of the imaging field where pixels have respective similarities which are not greater than the similarity threshold value.

20. A method as claimed in claim 19, wherein the image pickup device is an infrared image pickup device; and
wherein the distinguishing step includes the step of determining an area of the imaging field where pixels have respective difference values having a positive polarity and have respective similarities which are not greater than the similarity threshold value to be an area of the imaging field where a temperature has increased.

21. A method as claimed in claim 19, wherein the image pickup device is an infrared image pickup device; and
wherein the distinguishing step includes the step of determining an area of the imaging field where pixels have respective difference values having a negative polarity and have respective similarities which are not greater than the similarity threshold value to be an area of the imaging field where a temperature has decreased.

22. A method as claimed in claim 14, wherein the calculating step is performed after the converting step, and is performed only for pixels having respective difference values which are higher than the difference threshold value.

23. A method as claimed in claim 14, wherein the sensing step includes the step of sensing whether an object is within the imaging field by comparing the similarities with a similarity threshold value which is changed in response to the polarities of the difference values so that an object within the imaging field is distinguished from an area of increased brightness within the imaging field and an area of increased darkness within the imaging field.

24. An apparatus for sensing an object within an imaging field of an image pickup device, the apparatus comprising:
a memory for storing data of a reference background picture of the imaging field;
means for inputting picture data from the image pickup device;
means for comparing the inputted picture data with the stored reference background picture data to detect a difference value between the inputted picture data and the stored reference background picture data, and to detect a polarity of the difference value;
a converter for converting the difference value into binarization data based on a difference threshold value which depends on the polarity of the difference value;
a calculator for calculating a similarity between the inputted picture data and the stored reference background picture data; and
a detector for sensing whether an object is within the imaging field based on the polarity of the difference value, the similarity, and a similarity threshold value which is changed in response to the polarity of the difference value so that an object within the imaging field is distinguished from an area of increased brightness within the imaging field and an area of increased darkness within the imaging field.

25. An apparatus as claimed in claim 24, wherein the converter includes
a first converter which converts the difference value into first binarization data based on a first difference threshold value if the polarity of the difference value is positive, and
a second converter which converts the difference value into second binarization data based on a second difference threshold value if the polarity of the difference value is negative; and
wherein the detector senses whether an object is within the imaging field based on the first binarization data, the second binarization data, the similarity, and the similarity threshold value.

26. A method of sensing an object within an imaging field of an image pickup device, the method comprising the steps of:
storing data of a reference background picture of the imaging field;
reading out picture data from the image pickup device;
comparing the read-out picture data with the stored reference background picture data to detect a difference value between the read-out picture data and the stored reference background picture data, and to detect a polarity of the difference value;
converting the difference value into binarization data based on a difference threshold value which depends on the polarity of the difference value;
calculating a similarity between the read-out picture data and the stored reference background picture data; and
sensing whether an object is within the imaging field based on the polarity of the difference value, the similarity, and a similarity threshold value which is changed in response to the polarity of the difference value so that an object within the imaging field is distinguished from an area of increased brightness within the imaging field and an area of increased darkness within the imaging field.

27. A method as claimed in claim 26, wherein the converting step includes the steps of
converting the difference value into first binarization data based on a first difference threshold value if the polarity of the difference value is positive, and converting the difference value into second binarization data based on a second difference threshold value if the polarity of the difference value is negative; and wherein the sensing step includes the step of sensing whether an object is within the imaging field based on the first binarization data, the second binarization data, the similarity, and the similarity threshold value.

28. A method as claimed in claim 26, wherein the step of storing the reference background picture data includes the steps of:

reading out a predetermined number of frames of picture data from the image pickup device during a predetermined period;

calculating median picture data of the predetermined number of frames of picture data read out from the image pickup device; and updating the stored reference background picture data with the median picture data.

29. A method as claimed in claim 28, wherein the predetermined number of frames of picture data read out from the image pickup device during the predetermined period is smaller than a total number of frames produced by the image pickup device during the predetermined period.

30. A method as claimed in claim 28, wherein a period at which each of the predetermined number of frames of picture data is read out from the image pickup device is longer than a period at which the image pickup device produces one frame of picture data.

31. A method as claimed in claim 28, wherein the sensing step includes the step of issuing an alarm if an object is sensed; and wherein the step of updating the stored reference background picture data includes the step of updating the stored reference background picture data if an object is not sensed in the sensing step.

32. A method as claimed in claim 28, wherein the step of reading out the predetermined number of frames of picture data includes the steps of reading out N1 frames of picture data from the image pickup device, N1 being a positive integer of at least two, and reading out N2 frames of picture data from the image pickup device if an object is not sensed in the sensing step, N2 being a positive integer of at least two, N2 being less than N1;

wherein the step of calculating median picture data includes the steps of calculating first median picture data of the N1 frames of picture data; and calculating second median picture data of the N2 frames of picture data; and wherein the step of updating the stored reference background picture data includes the step of replacing the stored reference background picture data with any one of the first median picture data and the second median picture data.

33. A method as claimed in claim 28, wherein the step of updating the stored reference background picture data includes the step of updating the stored reference background picture data with the median picture data when an object is not sensed in the sensing step.

34. A method as claimed in claim 26, further comprising the step of updating the stored reference background picture data when the object is not sensed.

35. A method of sensing an object within an imaging field of an image pickup device, the method comprising the steps of:

storing data of a plurality of pixels of a reference background picture of the imaging field;

reading out picture data of a plurality of pixels from the image pickup device;

comparing the data of the pixels of the read-out picture data with the data of corresponding ones of the pixels of the stored reference background picture data to detect respective difference values between the data of the pixels of the read-out picture data and the data of the corresponding one of the pixels of the stored reference background picture data, and to detect respective polarities of the difference values;

converting the difference values into respective binarization data based on a threshold value which depends on the respective polarities of the difference values;

calculating respective similarities between the pixels of the read-out picture data and the corresponding one of the pixels of the stored reference background picture data; and sensing whether an object is within the imaging field based on the polarities of the difference values, the similarities, and a similarity threshold value which is changed in response to the polarities of the difference values so that an object within the imaging field is distinguished from an area of increased brightness within the imaging field and an area of increased darkness within the imaging field.

36. A method as claimed in claim 35, wherein the calculating step is performed after the converting step.

37. A method as claimed in claim 36, wherein the sensing step includes the steps of:

comparing the similarities with the similarity threshold value; and sensing that an object is within an area of the imaging field where pixels have respective similarities which are not greater than the similarity threshold value.

38. A method as claimed in claim 36, wherein the sensing step includes the steps of:

comparing the similarities with the similarity threshold value; and sensing that an object is not within an area of the imaging field where pixels have respective difference values having a positive polarity, and have respective similarities which are greater than the similarity threshold value.

39. A method as claimed in claim 36, wherein the sensing step includes the steps of:

comparing the similarities with the similarity threshold value; and sensing that an object is not within an area of the imaging field where pixels have respective difference values having a negative polarity, and have respective similarities which are greater than the similarity threshold value.

40. A method as claimed in claim 36, wherein the sensing step includes the steps of:

comparing the similarities with the similarity threshold value; and distinguishing an area of the imaging field where pixels have respective similarities which are greater than the similarity threshold value from an area of the imaging field where pixels have respective similarities which are not greater than the similarity threshold value.

41. A method as claimed in claim 40, wherein the image pickup device is an infrared image pickup device; and wherein the distinguishing step includes the step of determining an area of the imaging field where pixels have respective difference values having a positive polarity and have respective similarities which are not greater than the similarity threshold value to be an area of the imaging field where a temperature has increased.

42. A method as claimed in claim 40, wherein the image pickup device is an infrared image pickup device; and wherein the distinguishing step includes the step of determining an area of the imaging field where pixels have respective difference values having a negative polarity and have respective similarities which are not greater than the similarity threshold value to be an area of the imaging field where a temperature has decreased.

43. A method as claimed in claim 35, wherein the calculating step is performed after the converting step, and is performed only for pixels having respective difference values which are higher than the difference threshold value.

* * * * *